United States Patent
Fiszman et al.

[11] Patent Number: 6,115,646
[45] Date of Patent: Sep. 5, 2000

[54] DYNAMIC AND GENERIC PROCESS AUTOMATION SYSTEM

[75] Inventors: Sergio Adrian Fiszman, Nepean; Jason Benwell, Gloucester; Ari Sodhi, Nepean, all of Canada

[73] Assignee: Nortel Networks Limited, Montreal, Canada

[21] Appl. No.: 08/993,530

[22] Filed: Dec. 18, 1997

[51] Int. Cl.[7] .................................................. G06F 19/00
[52] U.S. Cl. ............................ 700/181; 700/2; 700/17; 700/49; 700/83; 700/86; 700/104; 700/181; 700/246; 700/247; 700/250
[58] Field of Search ........................ 434/108, 109; 701/55, 56; 707/500, 513; 705/32; 700/2, 17, 49, 83, 86, 104, 181, 246, 247, 250

[56] References Cited

U.S. PATENT DOCUMENTS

| | | | |
|---|---|---|---|
| 5,301,320 | 4/1994 | McAtee et al. | 705/9 |
| 5,490,097 | 2/1996 | Swenson et al. | 395/500.23 |
| 5,490,266 | 2/1996 | Sturges | 395/500.36 |
| 5,535,322 | 7/1996 | Hecht | 705/1 |
| 5,550,967 | 8/1996 | Henderson et al. | 395/336 |
| 5,581,691 | 12/1996 | Hsu et al. | 714/15 |
| 5,627,764 | 5/1997 | Schutzman et al. | 709/207 |
| 5,630,069 | 5/1997 | Flores et al. | 705/7 |
| 5,659,716 | 8/1997 | Selvidge et al. | 395/500.44 |
| 5,675,745 | 10/1997 | Oku et al. | 705/7 |
| 5,893,128 | 3/1999 | Nauckhoff | 707/511 |

*Primary Examiner*—William Grant
*Assistant Examiner*—McDieunel Marc

[57] ABSTRACT

GPAE is a dynamic and generic object-oriented process automation engine that provides workflow management (WFM) services in a heterogeneous distributed computing environment. This invention decouples process definitions, run-time process management, and process execution agents. The system consists of three major parts: (a) a build time part used to capture and store process definitions, and to request the enactment of a process; (b) a run time part used to schedule, execute, and monitor the requested process; (c) a CORBA bus to plug-in software applications needed to execute processes, and to allow interactions among the system components. This GPAE invention, based on CORBA, and event-driven and constraint propagation models, provides near optimal scheduling and resource allocation schemes. This invention is generic, scalable, flexible, and enables the process automation in a distributed heterogeneous platform environment, while sharing global resources and services efficiently.

15 Claims, 19 Drawing Sheets

FIG. 6

Work List

Commands | Help

Dead Line | Owner | Subject | Task_type

Refresh | Cancel

DYNAMIC AND GENERIC PROCESS AUTOMATION SYSTEM

FIELD OF THE INVENTION

The invention relates to process automation and more particularly relates to work flow management in a geographically dispersed distributed heterogeneous computing environment.

BACKGROUND OF THE INVENTION

Many processes are made up of a number of activities which must be performed by different software applications on geographically distributed processing nodes. Such processes often also include steps which must be executed by humans. It would be advantageous to have a process automation system which is capable of running such processes in an automated fashion in a manner which makes efficient use of the resources provided by the distributed processing nodes, and which at the same time satisfies various constraints. It would also be advantageous for such a system to be dynamically configurable at run time, and to permit the "plug and play" of new applications on the processing nodes without effecting previously existing processes.

U.S. Pat. No. 5,535,322 to Hecht, which issued Jul. 9, 1996, entitled "Data Processing System with Improved Work Flow System and Method" describes a system which uses an overall pull system design and an attribute-based file system to store work in progress. The common "pull system" protocol uses DCE (Distributed Computing Environment—a standard from the Open Software Foundation), and each application service pulls work only when it is ready; there is no pushing of work onto an application service. It also does not use an ORB (object request broker) and does not provide the ability for dynamic scheduling.

U.S. Pat. No. 5,627,774 to Schutzman et al which issued May 6, 1997 entitled "Automatic Electronic Messaging System with Feedback and Work Flow Administration" describes an event-driven and conditional rule-based system. The system status reporting or feedback is used for follow-up activity, such as workflow administration or routing. The control in the Schutzman system is centralized, does not use an ORB, and does not provide the ability to extend services at run time.

Also, in Schutzman the feedback information is used for work flow administration, allocating work or tasks in accordance with rules or applications among different queues.

U.S. Pat. No. 5,581,691 to Hsu et al which issued Dec. 3, 1996 entitled "Work Flow Management System and Method" describes a work flow management system and method for executing and tracking the progress of long running work flows, and for recovering from system failures during the execution of long running work flows. The system does not use an ORB bus, but instead uses a static scheduling scheme based on time-outs, and uses a centralized control scheme based on a "Flow" controller that controls the execution of each work flow. In terms of recovery, the Hsu system logs records and output event signals, stored in a history database, to ensure the recovery of a work flow upon a system failure.

U.S. Pat. No. 5,301,320 to McAtee which issued Apr. 5, 1994 entitled "Work Flow Management and Control System" describes an approach to the creation of large application systems by representing workflow tasks in a fully modular fashion that allows the designer to alter the order and relationships among tasks without the reconfiguration of the entire workflow system. The system can integrate various types of application software, and is capable of partitioning tasks among various operators, computers and computer terminals as specified by the designer. This integration is not done using an ORB bus; and is not object-oriented, and does not have dynamic features such as dynamic scheduling.

U.S. Pat. No. 5,630,069 to Flores which issued May 13, 1997 entitled "Method and Apparatus for Creating Workflow Maps of Business Processes" describes a method and system which provides consultants, business process analysts, and application developers with a unified tool with which to conduct business process analysis, design, and documentation. The fundamental concept of workflow analysis is that any business process can be interpreted as a sequence of basic transactions called workflows. The workflow system uses client/server design and concentrates workflow operations in the workflow server rather than the end user applications.

In addition to the above described patent literature regarding workflow systems, there are several existing commercially available work flow management software products.

One such product entitled "Action Workflow Enterprise Series" developed by Action Technologies does not support dynamic scheduling, does not use an ORB bus, and does not support the WPDL (Workflow Process Definition Language) of the WfMC (Workflow Management Coalition). It only focuses on human centred workflows. In addition, since the modelling elements for the organizational embedding are not very expressive (only roles and identities), complex rules of responsibility cannot be modelled at all.

A system entitled "COSA" from the German software company Software-Ley is built according to the client/server paradigm, does not use an ORB, and does not provide dynamic scheduling of processes. COSA's modelling elements are dedicated to model human organizations, not "organizations" of servers, machines and cells which might be useful in manufacturing environments. The only data types supported in COSA are files and unstructured variables. Data flow of structured data between activities cannot be specified.

Another WFM system, FlowMark, from IBM is a database centred workflow management system. It does not use an ORB bus, does not support dynamic scheduling, does not support runtime extension of services, and does not support dynamic upgrades to notification policies. FlowMark follows the client/server paradigm. The only way to execute a FlowMark process without human intervention is to declare program or process activities as automatic.

InConcert from XSoft uses standard services like RPC (remote procedure call), NFS (network file system) and database, and does not use an ORB bus. InConcert is distributed over a heterogeneous network according to a client/server architecture. It does not support dynamic scheduling and does not extend workflow services at run time.

Finally, SAP Business Workflow from SAP AG is a database centred WFM system which uses R/3 to provide an enterprise with standard functionality for information processing. SAP Business Workflow is integrated into R/3 and not a stand-alone system.

SUMMARY OF THE INVENTION

It is an object of the invention to obviate or mitigate one or more of the above identified disadvantages.

Another object of the GPAE invention is to provide an improved decoupling method for processes, control engine, and agents that execute the processes following the "orders" of the control engine.

Another object of the invention is to provide scalable work flow management services over a distributed and heterogeneous computing network.

A further object of the invention is to provide extensible mechanisms that support the dynamic (run time) plug-in of processes, agents and services.

According to a first broad aspect, the invention provides a process automation system for controlling the execution of processes on a plurality of processing nodes each having processing agents associated therewith, the system comprising a GPAE (generic process automation engine) and an ORB (object request broker) bus connected to the plurality of processing nodes, the GPAE having: a) a build time part for creating and storing at least one process definition identifying a sequence of work items, pre-conditions and post-conditions for the execution of work items, and propagation rules for propagating outputs of work items to inputs of other work items, and for creating and storing a request to create a process instance for a particular process definition; b) a run time part comprising process instance servers for coordinating the enactment of the work items forming part of the process definitions and a scheduler for scheduling each work item forming part of the process definition either for execution at a given time and by a particular processing agent on a particular one of the processing nodes or for execution by a human, the scheduler using constraint propagation logic.

Advantageously, the process automation system can be used in those application areas that require the automation of processes to (a) reduce costs, (b) reduce process execution times, (c) increase quality, and (d) support increasing bandwidth demands. Examples of these application areas include: ordering management, inventory control, banking, health, government services, production related processes, medical processes, S/W electronic delivery, automated testing, automated assembly, and network management.

The process automation system is preferably event-driven; for example, the completion of an activity instance triggers an event to the parent process instance to execute the next set of activities.

With CORBA's (common object request broker architecture) object request broker (ORB), a client calls a method within a specific object. Different object classes may respond to the same method invocation differently through the polymorphism mechanism. Because each object manages its own private instance data, the method is implemented on that specific instance data.

CORBA is based on the object-oriented paradigm. The object-oriented paradigm supports key concepts: inheritance, data encapsulation, polymorphism, and separation of interface and behaviour as an object's components.

Preferably, GPAE uses a dynamic notification paradigm: those parties that are interested in an event register their interest with GPAE and are notified upon the occurrence of the event. In GPAE the recipient of an event can specify the action to be executed (similar to a "callback" mechanism) at run time.

Preferably, GPAE's control is distributed in a set of process instances, and its dynamic scheduling and resource allocation mechanisms are based on constraint propagation logic theory.

Preferably, GPAE uses an ORB and a pool of plugged-in process instances that act as distributed work flow engines.

These work flow engines control and enact the contained network of activities according to the corresponding process definition, input data, and the schedule, created by the scheduler-resource allocator server plugged into the CORBA bus.

Preferably, GPAE's architecture is open: new roles can be created, new processes can be modelled, and new services can be added at run time. In this regard, GPAE can also be considered as a distributed object-oriented and pattern-oriented work flow development environment.

Preferably, GPAE monitors the state of servers continuously and recovers them as needed at run time using the persistent state.

Preferably, GPAE provides the ability to model processes and to enact manual and automated activities.

BRIEF DESCRIPTION OF THE DRAWINGS

Preferred embodiments of the invention will now be described with reference to the attached drawings in which:

FIG. 6 is an illustration of a work list menu that may be used to monitor manual (non-automated) tasks;

FIGS. 8a and 8b are illustration of two forms that display the run time progress in response to a query;

FIG. 18 is an example of a screen display form which may be used to submit a request and to specify the execution of a selected process.

DETAILED DESCRIPTION OF THE PREFERRED EMBODIMENTS

Figure 1:
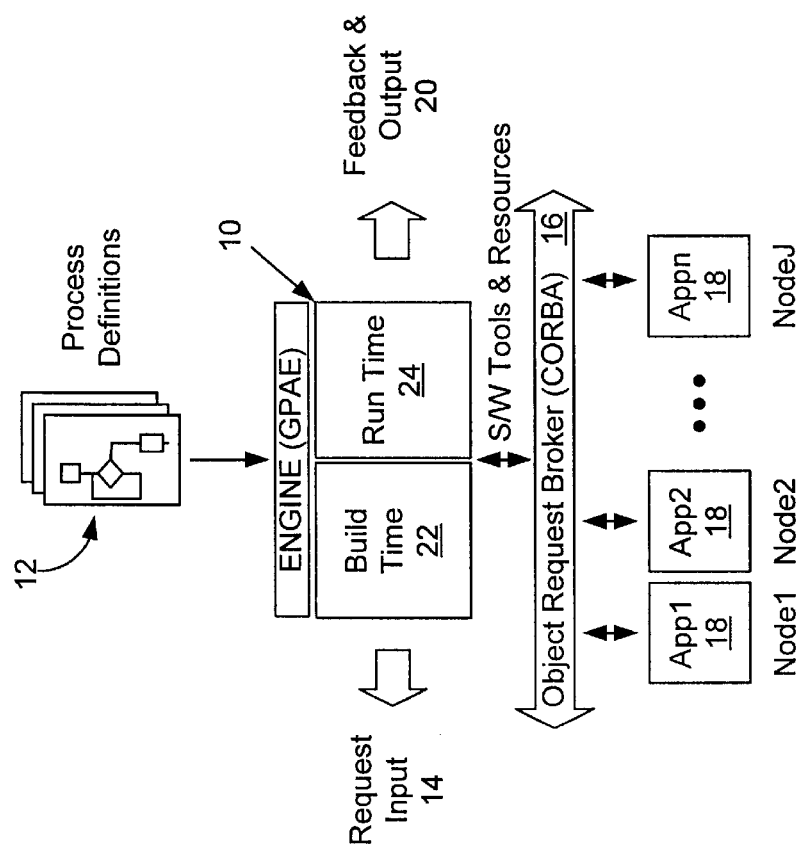
FIG. 1 is a top level architectural view of a process automation system according to an embodiment of the invention.

Referring firstly to FIG. 1, a top level architectural view of a process automation system according to an embodiment of the invention includes has two main components, these being a GPAE (general purpose automation engine), or simply "engine" 10 and a CORBA (common object request broker architecture) bus 16. The purpose of the engine 10 is to coordinate through the CORBA bus 16 the execution and automation of a plurality of processes on a plurality of processing nodes 18 connected to the CORBA bus in a manner which makes efficient use of the processing nodes and which satisfies various conditions and constraints for the execution of the processes.

The processes are defined as process definitions 12 which are input to the GPAE 10. A process definition is a specification of a sequence of work items that need to be executed for a given process and a series of conditions or constraints for their execution.

The processing power for executing processes resides in the processing nodes 18 on which various software applications or tools execute. More particularly, the processing nodes are capable of executing activities which may be included as part of a work item in a process definition.

It may be that one or more actions forming part of a process definition require human input or action. A human performing such an input or action will be referred to as a "role". Thus a particular activity may be executed by a processing node or a role. Roles and tools/applications available to be run on processing nodes together will be referred to as "processing agents" or simply "agents".

The engine 10 is connected to the processing nodes 18 through the CORBA bus 16. Through the CORBA bus 16, the engine 10 is capable of invoking any of the tools/applications on the processing nodes 18. The engine 10 serves to decouple the process definitions 12 from the processing agents.

When a particular process is to be run, an input is made to the engine 10 in the form of a request 14. The request identifies the process to be executed and contains input information for a specific instance of the process. As described in detail below, the engine 10 then coordinates the execution of the process, and generates any appropriate feedback and output 20.

As described previously, the system has an engine component 10 and a CORBA bus component 16. The engine 10 consists of two main parts, these being a build time part 22 and a run time part 24.

The build time part 22 is used by roles to:
capture a process definition graphically and store it in a repository, describing its components, order of execution, conditions for their execution, and attribute propagation rules;
approve a process definition for its usage in production;
model resources;
model, define roles and access control privileges;
define goals (policies) mainly for notification, scheduling, resource allocation, and security services;
create a request, tie it to a process definition, specify the priority and due date, and submit the request to the run time part 24; and
query progress of scheduled and enacted requests.
The run time part 24 is the part of the system that:
notifies roles about events, this is the only service exported in this part to roles;
schedules and allocates resources to requests based on the run time availability of resources and defined goals;
executes (enacts) the processes identified by the due requests; and
stores the system's operational and state information persistently for recoverability and historical-trail reasons.

The CORBA bus 16 is the part of the system that is used to:
plug-in tools (software applications) that execute work items forming part of processes;
allow client objects and server objects to communicate;
allow the interaction of the components of the build time, run time parts, plug-in tools, and ORB services.
CORBA CORBA is a dynamic distributed architecture framework which may be used to efficiently combine components into systems. The most recent specification of CORBA is CORBA 2.0. The services which run on CORBA are specified in the CORBAServices: Common Object Services Specification, produced by the Object Management Group, Inc. in Nov. 22, 1996. There are various commercial products available which implement CORBA 2.0, such as IONA's Orbix 2.2.

The CORBA bus provides two main components, namely an IDL (interface definition language) and an ORB (object request broker). CORBA uses IDL contracts to specify boundaries of components residing on the bus and the component's contractual interfaces with potential clients. The CORBA IDL is purely declarative. This means that it provides no implementation details. IDL provides operating system and programming native independent interfaces to all the services and components that reside on a CORBA bus. It allows client and server objects written in different languages to inter-operate. A client object is either a system process, or an entity (object) within a system process that invokes a method (a member function) on a representative object (proxy) of a server object to request a set of specific actions. A server object is either a system process or an object that a) has an IDL interface, b) is plugged-in to the bus, and c) satisfies a request. Server objects are packaged as binary components that remote clients can access via method invocations. Client objects need to know the IDL interface that a server object publishes.

The object request broker (ORB) is the object bus. It lets objects transparently make requests to and receive responses from other objects located locally or remotely.

The GPAE engine (10 in FIG. 1) can be considered as a client of a set of object servers, the servers being the tools provided by the applications/components on the processing nodes 18, when the engine requests the tools to execute, using a set of in attribute values of activities, and to capture the tools's execution statuses in a set of activities' out attributes.

The build time part 22 can also be considered a client of the run time part 24. The ORB 16 receives client requests from the build time part 22 and dispatches them to the corresponding server(s) in the run time part 24 to service the requests.

In CORBA, a client/server application becomes a collection of collaborating components. Another example of a runtime object interacting with a server buildtime object is the instantiation of a process instance. The process instance being instantiated asks the process definition (a buildtime object) for its graph information (network of work items). The process definition returns the requested graph and the process instance copies it to itself.

Figure 2:
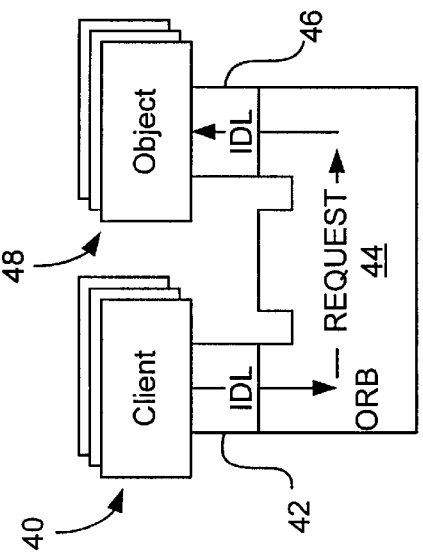
FIG. 2 is a logical view of a CORBA (common object request broker architecture) bus.

A logical view of the CORBA bus is shown in FIG. 2. A number of client objects 40 are shown each connected through a respective IDL interface 42 to the ORB 44 which is in turn connected to a number of server objects 48 through another respective IDL interface 46.

For one object to request something from another object, it must know the target object's IDL interface. CORBA has an interface repository containing definitions of all these IDL interfaces. It also contains metadata that lets components discover each other dynamically at run time. This makes CORBA a self-describing system. As an example of what one object might request from another, a GUI (client object) can query the run time part of GPAE (server object) about the status of a specific request instance. Request instances are named components which are stored persistently in GPAE's ObjectStore based repository.

The client objects 40 do not need to be aware of the mechanisms used to communicate with or activate the server objects 48. A CORBA ORB's client/server middle-ware provides the following main benefits: static and dynamic method invocations, high-level language bindings, self-describing system, local/remote transparency, built-in security and transactions, polymorphic messaging and coexistence with existing systems.

Using a CORBA bus in the process automation system according to this embodiment of the invention provides the benefit that new software applications that execute activity and process instances can be registered and added to the bus at run time. This allows the run time "plug-in" of new process definitions and their execution without affecting the overall functionality or availability of the system at run time. This is important because an authorized role can use this capability to test/introduce a new process in a "testing" environment, thus not impacting production. Another benefit is that a new implementation for an existing GPAE service can be added and tested at run time. The client is not aware of a servers' implementation.

In addition CORBA 2.0 specifies an Internet-inter-ORB protocol (IIOP). The IIOP is basically TCP/IP with some CORBA-defined message exchanges that serve as common backbone protocol.

The Object Management Group (OMG) has published standards (CORBAServices) for fifteen object services; the ones used by GPAE are the naming service, the event service, the life cycle service, the security service, and the trader service, and these will now be briefly described.

The naming service allows components residing on a bus to locate other components (distributed objects) by name. GPAE uses this service to register servers (e.g., persistent server, process instance servers) with the naming service at bootstrap time and dynamically at run time. The run time registration of servers is used to support the ability to extend the services provided by GPAE at run time.

The event service allows distributed objects to dynamically register or unregister interest in specific events. The event service defines an object called an event channel that collects and distributes events among components that know nothing of each other. This service is used in the GPAE to implement a) a model view controller (MVC) pattern between the work item definitions/runtime entities (model), the controller (the GPAE's APIs) and the GUI (view), and b) the notification of the outcome of processes to work list menus or to interested parties. The Controller aspect of the Model View Controller (MVC) pattern is the GPAE's Application Programmatic Interface (API). This API serves as a programming interface between he GUI (the view) and the GPAE Build-Time/Run-Time objects (the model). It is responsible for interpreting events from the view and sending appropriate messages to the model. It then tells the view to update itself accordingly based on returned values from the messages sent to the model. The pattern interactions can be illustrated as follows:

View (GUI)<==>Controller (API)<==>Model (BuildTime Objects). The "<==>" symbol represents an interaction between two entities. The term "controller" should not be confused with the controller (process instance) to be discussed later. The use of the word controller here is a historical one used to describe this MVC pattern.

The life cycle service defines operations for creating, copying, moving and deleting components on the bus. This service is used to implement the factory pattern (Gamma 95).

Factories are used to create instances of objects in their respective servers. From a client perspective CORBA objects are often created by invoking normal CORBA operations on factory objects. Factory operations activate CORBA objects (server citizens) as well.

Activation is the act of starting an existing CORBA object to service requests (method invocations). The opposite operation to activation is called deactivation. Deactivation is the act of shutting down an active CORBA object. For example, if an activity instance object must be activated then the following generic algorithm is used: (a) use a factory finder to find an activity instance factory in the activity instance server, and then (b) send a create message to the factory; the invocation of this message creates and activates an activity instance object within the activity instance server.

Each GPAE (CORBA) server has a factory finder. The factory finder can be used to find a factory responsible for the creation of objects of a specific type. For example, a factory finder in the Definition Server is used to find either a process definition factory or an activity definition factory. A server that supports multiple CORBA objects, like the Definition Server is known as a Shared server. Most GPAE servers are both shared and multi-threaded servers.

The security service provides a complete framework for distributed object security. It supports authentication, access control lists, confidentiality, and non-repudiation. It also manages the security policy. The implementation of the GPAE uses this service to control and audit access the read/write access stored information such as work item definitions, operational data, and historical data.

The trader service provides a "Yellow Pages" for objects; it allows objects to publicize their services and allow clients to find them based upon which services the client needs. For example, the resource allocator 78 uses this service to find a resource that satisfies a set of agent's constraints (e.g., CPU target).

Figure 3:
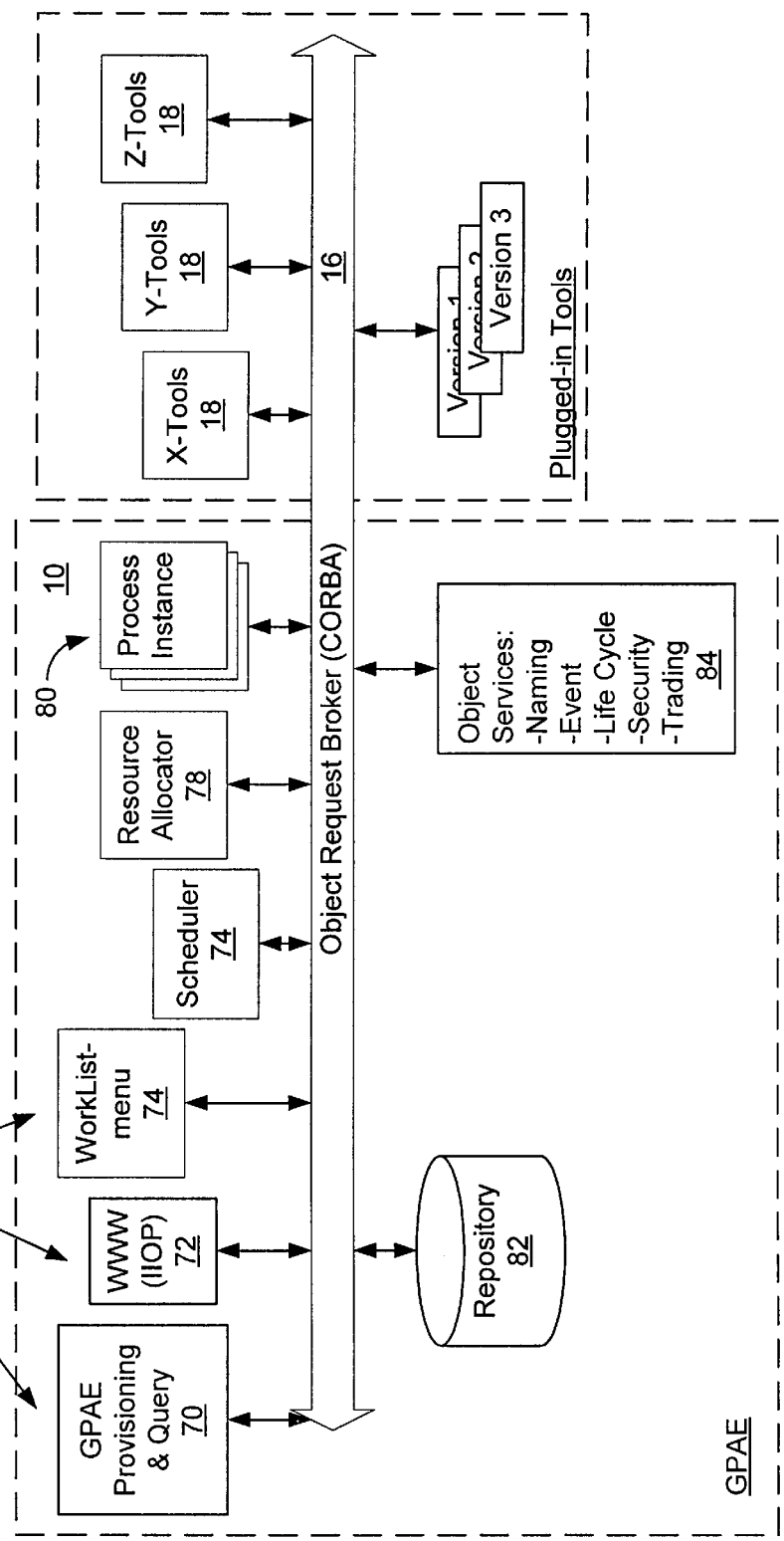
FIG. 3 is a more detailed block diagram of the process automation system of FIG. 1.

A more detailed block diagram of the process automation system according to this embodiment of the invention is shown in FIG. 3. The system includes the CORBA bus 16, the GPAE 10, and a number of plugged in tools (running on processing nodes) 18. The GPAE 10 includes the following blocks, all of which are connected together through the CORBA bus 16: GPAE provisioning and query 70, WWW (IIOP) 72, work list menu 74, scheduler 76, resource allocator 78, process instances 80, repository 82, and object services 84. Each of these blocks will now be briefly described with further details being provided later where appropriate.

The GPAE provisioning and query block 70 provides a "query view" of process instances 80, enabling an authorized role to find out about request progress, operational data (e.g., start time of execution of a process, its duration, and outcome), and historical data (errors recorded persistently). Historical data is used to find patterns of errors and then conduct proper root cause analysis to improve processes.

The WWW (IIOP) block 72 provides an interface to the WWW as described previously. IIOP specifies how a set of message formats and common data representations for communicating between ORBs are exchanged over a TCP/IP network. IIOP makes it possible to use the Internet itself as a backbone ORB through which other ORBs can bridge. In addition, IIOP also defines a format for interoperable object references (IORs).

The work list menu 74 is a list of activities to be performed by roles.

The scheduler 76 is a multi-threaded server. It has the responsibility of producing a schedule that considers the available resources (processing nodes and human resources), an activity's static constraints (e.g., computer's architecture, swap space, disk space), an activity's dynamic constraints (e.g., load average), and overall process goals, such as load balancing, round-robin use of resources, the minimization of the utilization of a set of resources, and the maximization of the utilization of another set of resources.

A schedule produced by the scheduler 74 provides to activities forming part of a requested process instance 80, a tuple composed of a host and a time. The host is where an agent (tool or role) associated with an activity executes; and the time is the date and time when the agent will execute.

The termination of the execution of an activity triggers an event for the scheduler 76. The scheduler 76 interacts with the resource allocator 78 to request a resource that meets the next activity's constraints.

The resource allocator 78 is a server which has a dynamic view of the available resources. Resources can be modelled and characterized in terms of static and dynamic properties. The resource allocator 78 uses the CORBA's trader service to find resources that support a set of static and dynamic properties. Static properties are those related to the hardware and operating system of a computing node. Dynamic properties are those related to the runtime state of the computing node; these include load average, utilization factor, number of available file descriptors, available memory, and free disk space. The scheduler 76 and the resource allocator 78 are preferably based on constraint-based mechanisms provided by ILOG.

The process instance 80 is a work flow "engine" responsible for the execution of its contained sub-processes and activities in serial or parallel modes. The process instance 80 invokes the "execution" method on activities. There is a process instance per enacted process definition. In CORBA, the process instance is a CPIS (CORBA process instance multi-threaded server). There is a pool of CPISs that get recycled according to the number of incoming requests to GPAE. The process instances 80 start the set of tools associated with activities at the time and place specified by the schedule.

The repository 82 is where process definitions, activity definitions, attribute definitions requests, process instance data, activity instance data and operational and historical data are stored persistently.

The object services block 84 includes the previously described naming service, event service, life cycle service, security service and trader service.

Users 86 are capable of interacting through GUIs (graphical user interfaces) on user workstations 88. The user workstations 88 can be connected to a LAN or WAN inter/intra computing networks. Through the GUIs, users are able to interact with the GPAE provisioning and query block 70, the WWW (IIOP) block 72, and the work list menu 74.

The ORB 16 may for example be IONA's Orbix 2.2 implementation of CORBA 2.0 and its object services. For this implementation, each workstation where a CORBA server runs has to have an Orbix daemon running. The Orbix daemon represents the activation part of the CORBA ORB. All persistent data (definitions, operational and historical data) may for example be stored in an object-oriented repository built on top of an OODBMS (object oriented database management system) such as ObjectStore 5.0 from Object Design Inc. The scheduler may for example be implemented using ILOG's products Schedule and Solver 3.2. The GUI may for example be developed using ILOG's GUI Builder and JAVA's AWT class library. As part of the implementation strategy, a set of design patterns have been implemented. The design patterns used in GPAE include:

Model View Controller (MVC)

This isolates a model object from the view through the used of a controller which reacts to events from the view and sends appropriate messages to the model. The controller then tells the view to update itself based on the result of the messages sent to the model. The GPAE, the MVC model is implemented using CORBA's event services.

Factory

This abstracts life cycle operations (create/copy delete/move & activation of distributed objects).

Abstract Server

It is possible to create abstractions that are fixed and yet represent an unbounded group of possible behaviours. The abstractions are base classes, and the unbounded group of possible behaviours is represented by all possible derivative classes.

For example, if a client interacts with an abstract server class, and it requires to use a different server, then a new derivative of the abstract server class can be created. The client can remain unchanged.

Strategy

This defines a family of algorithms, encapsulates each one, and makes them interchangeable, Strategy lets the algorithm vary independently from the client that uses it. Different strategies can be swapped in and out as need to be. This design pattern is used to implement the ability to change run time policies in real time.

Observer

This defines a one-to-many dependency between objects so that when one object changes state, all its dependents are notified and updated automatically.

The ORB uses two repositories: the Interface Repository (IFR) and the Implementation Repository (IR); they are not considered CORBA services but CORBA'a components. The IFR is an on-line database of object definitions (i.e., a container of IDL type definitions). The ORB uses the IFR for the following reasons: (a) to translate objects that go across heterogeneous ORB's; (b) to provide to clients the ability to obtain the interface information of any object; and (c) to allow clients to create "on-the-fly" method invocations. The IR is a storage place for the implementation definitions, such as information about which server implementations are installed in a given system.

Figure 10:
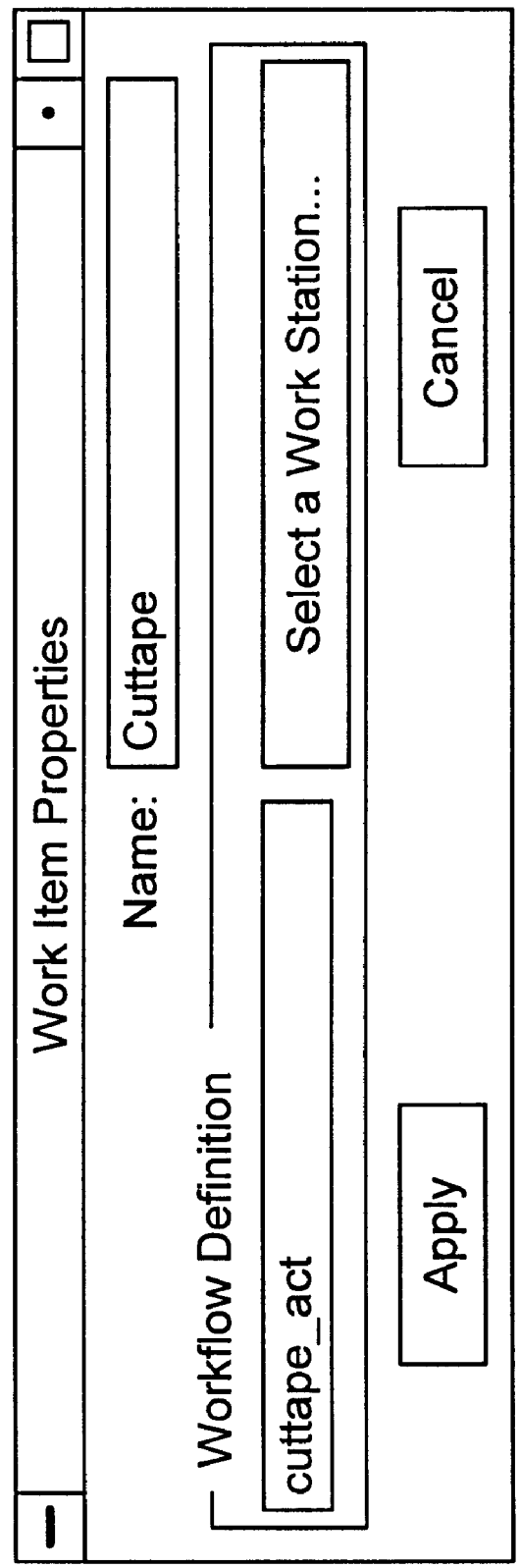
FIG. 10 is an illustration of a work item properties screen display.
Figure 11:
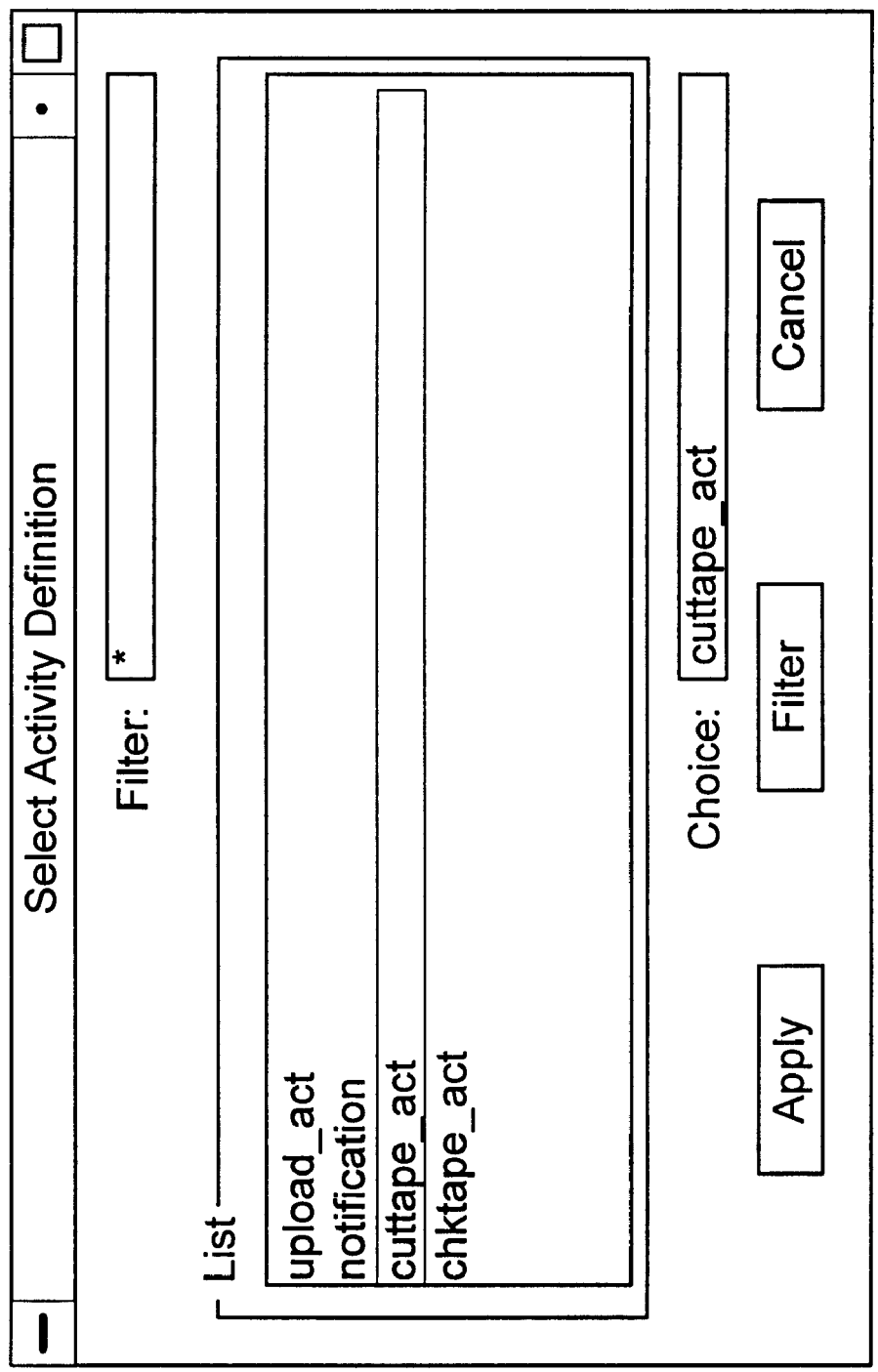
FIG. 11 is an illustration of a screen display used to select an activity definition.

The notification process shown on FIG. 10 may consist of a notification activity and other activities not shown in FIG. 11. When the system bootstraps all the service providers (servers) are registered with the naming service and their interfaces are stored in the interface repository (IFR).

Figure 4:
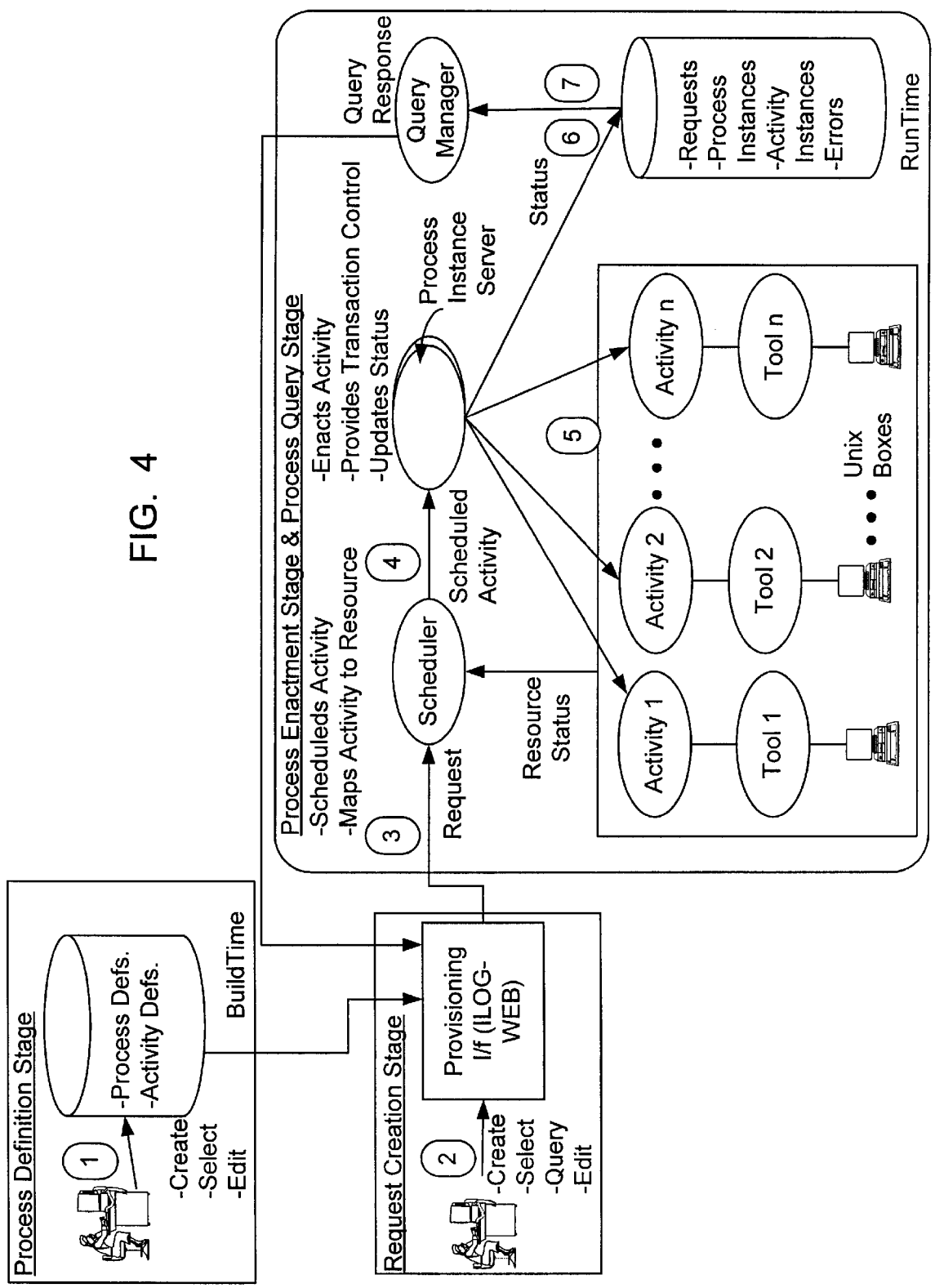
FIG. 4 is an illustration of the automated flow of the process automation system of FIG. 1.
Figure 5:
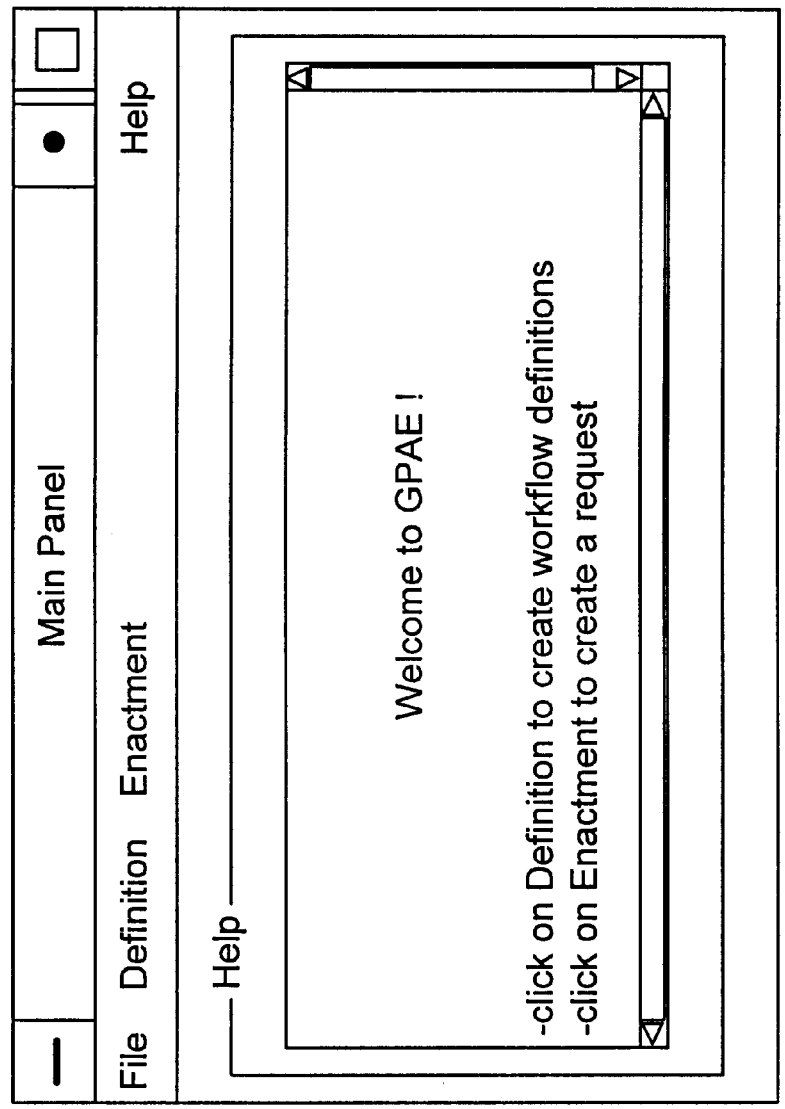
FIG. 5 is an illustration of a main panel screen display for the process automation system of FIG. 1.

FIG. 4 identifies the main control and data flow aspects of the buildtime and runtime parts of GPAE, including interaction with agents. A user is first presented with an introductory main panel such as shown in FIG. 5. The main panel of FIG. 5 presents the user with three main options, these being "File" which when selected allows a user to select an exit option (not shown) or to select a query option (not shown), "Definitions" which allows process definitions and related items to be defined or edited, and "Enactment" which allows a user to create a request for a process definition to be instantiated. If an authorized role selects the query option then a query window appears. The query window is described below with reference to FIGS. 7a and 7b.

The steps appearing in FIG. 4 can be classified into build time steps (executed by the build time component of GPAE as illustrated in FIG. 1) and run time steps (executed by the run time component of GPAE as illustrated in FIG. 1). The build time steps can be further broken down into steps forming part of a process definition stage and steps forming part of a request creation stage. The run time steps can be broken down into steps forming part of a process enactment stage, and steps forming part of a process query stage.

During the process definition stage, item 1 represents three buildtime steps consisting of the creation, edition, and approval of a process definition and its components by an authorized role. Further details regarding process definition are provided below with reference to FIGS. 9 to 16.

Item 2 represents four buildtime steps, these being the creation of a request, the query of another request to reuse its data or the query of process definitions, the edition of a request (data-filling of the request attributes), and the selection of a process definition, all done through the provisioning interface (part of the GPAE provisioning and query block 70 of FIG. 3). After a request is assembled and saved, it is submitted for enactment. During the request creation stage, an authorized role creates a request instance and ties it to a process definition. The data (in parameters and out parameter values) are specified at this stage, as well as the desired execution frequency, roles to be notified about the outcome of the request (also considered an event) and its priority. Request creation is described in further detail below with reference to FIG. 17.

Item 3 illustrates the flow of a request to the scheduler. Now the request has entered the process enactment stage.

In item 4, the scheduler produces a schedule based on item 3 and creates a process instance ( that contains a copy of the process definition) and allocates a process instance server to enact the process instance at the date and time the request is due. The scheduler has a dynamic view of the state of the available resources (e.g., human and computing nodes). More specifically, during the process enactment stage, when a request is passed to the scheduler, the scheduler knows about: a) the available resources, b) the schedule of all the requests submitted to the system, c) the requests' priority, and d) the request's due date-time. Based on this information, applying constraint propagation logic the CORBA scheduler produces a near optimal schedule. This schedule specifies when and where the first work item of a process should start executing.

The process instance server is responsible for the navigation and pruning of the graph of work items that is instantiated from the process definition. The process instance server contains a deep copy of the graph captured in the process definition. When multiple entities have a deep copy of some data, the entities have their own copy of the data; they do not share the data. If the data of one entity is modified, the other entity's data is not modified.

In item 5, a particular process instance server is executing a set of activities. The process instance server does this by launching tools at the date-time and on computing nodes specified by the schedule. To invoke a particular work item forming part of a process, an activity instance is created for the work item. Each activity instance invokes an "execute" method on a specific multi-threaded tool manager. A tool manager plugs a software application (a tool) into the CORBA bus. When the tool manager receives the "execute" invocation, it launches the tool (using the ORB) on the processing node specified in schedule. The tool executes and returns the outcome of the execution to the activity instance. The activity instance in turn returns the status of its execution to the process instance.

Tools that are plugged into the GPAE CORBA bus need to support an interface which allows GPAE to execute, suspend, cancel, and resume these tools. This interface is called the TM (tool manager). Tool execution requires an exchange of data between the tool manager and GPAE. Input to and output from a tool that interacts with the TM are exchanged through sequences of in attribute and out attribute objects. These are CORBA objects which encapsulate a name-type-value triad. Resources required by the tool (such as type of platform, disk space . . . etc.) are requested from GPAE, using the TM, and supplied to the tool as a sequence of resource objects. An example should clarify the above. Suppose there is a mailer legacy tool which sends an E-mail message to a set of recipients. A tool manager implementation to wrap this tool will require the following in attributes: sender's E-mail address, recipients' E-mail addresses, title of message, body of message. The tool manager will indicate the outcome of the execution (success or failure) using an out attribute called status. Additionally, the tool manager requests processing nodes on behalf of the tool: e.g., an HP-700 series computing node, to execute the tool, and a computing node that is connected to the inter/intra-net to interact to a global mailing system. When GPAE sends an execute request to the mailer's tool manager it will supply it with the sequence of required in attributes and resources that correspond to the requested processing nodes. The tool manager will then execute the tool on the supplied resources and collect its exit code. On finishing execution, the tool manager deposits the outcome of the mailing request into the status out attribute.

The process instance checks the conditions for the next set of activities. If an activity needs to be executed then it interacts with the scheduler to determine when and where it should be executed. If instead, the set of work items have been exhausted, then the process instance terminates and communicates the state of the termination to the request.

The request multi-casts the termination event and any interested parties are notified. This notification mechanism uses the CORBA event service. An authorized role can receive notification upon the occurrence of an event by means of a set of notification means. These notification means may include for example E-mail, electronic pager, and a work list window. When a CORBA object (sender) multicasts messages to other CORBA objects (receivers) plugged-in to the bus, it means that the sender communicates indirectly with the receivers by sending a message that a set of receivers will receive. The receiver determines what event it is interested in receiving and what it will do with the information it receives. In the terminology of the CORBA event service, the sender of a message is a supplier and the receiver a consumer. The event service allows objects to dynamically register or unregister their interest in specific events. A notification is a message an object sends to interested parties informing them that a specific event occurred. In GPAE, a set of work list menus are notified by a process instance about an activity instance error event. When a work list receives this event it adds the name of the activity instance and its (error) status to a list, ready to be displayed by an authorized role. The suppliers produce events; the consumers process them via event handlers. An event channel is an intervening object that is both a supplier and a consumer of events. It allows multiple suppliers to communicate with multiple consumers asynchronously (multicast) without knowing about each other. For example, in GPAE, a process instance pushes an activity instance error event to an event channel, and the event channel pushes the event to a set of work lists. A process instance is not aware that the event channel is pushing its event to other CORBA components or to work list menus. In GPAE's implementation, event channels are registered with CORBA's naming service.

The notification mechanism/service is event based and is responsible for multicasting events. Those parties interested in specific events are then notified. An interested party can register interest on an event (e.g., the successful execution of a process) and can also register the action to be performed upon the arrival of the event. One application of this service is the creation of reports that are posted in the Internet for its global access by authorized personnel. Another usage of the notification service is the one used by the work list menus. Work list menus, such as the one shown in FIG. 6, are updated by the notification service to notify specific roles about the set of tasks (manual activities) that need to be completed before deadlines. The block that does the notification is represented by the event service 84 in the block named object services. As explained previously, GPAE uses the CORBA event service to implement the notification service. The use of this service not only allows the notification of events to interested parties but also enables the event driven capabilities of GPAE.

Manual flow happens, for example, when the execution of an activity triggers an event that requires manual intervention (e.g., an unexpected error in the execution of a tool). In this case, the event will be multi-casted to a work list menu such as shown in FIG. 6 for example. An authorized role, who may have been notified, may access the work list (in-tray) menu. The role uses the work list to locate the request that contains the activity that triggered the event. At that point in time, the role has a set of (work list) choices which include cancelling the request, fixing the problem and restarting the request, fixing the problem and restarting the activity, and ignoring the problem and asking the request to continue. The selected choice "tells" the process instance contained in the request to take an action according to the selected choice.

In item 6 the process instance server is shown storing the status of the request (as well as any relevant operational data) in the repository. This information will then become available for query.

During the process query stage (which occurs concurrently with the process enactment stage) an authorized role can query the progress of a request, a process instance, or an activity instance. Item 7 illustrates the interaction between a CORBA query manager (part of the GPAE provisioning and query block of FIG. 1) and the repository. Item 8 shows the response of a query from a query manager flowing back to the query (provisioning interface).

Figure 7A:
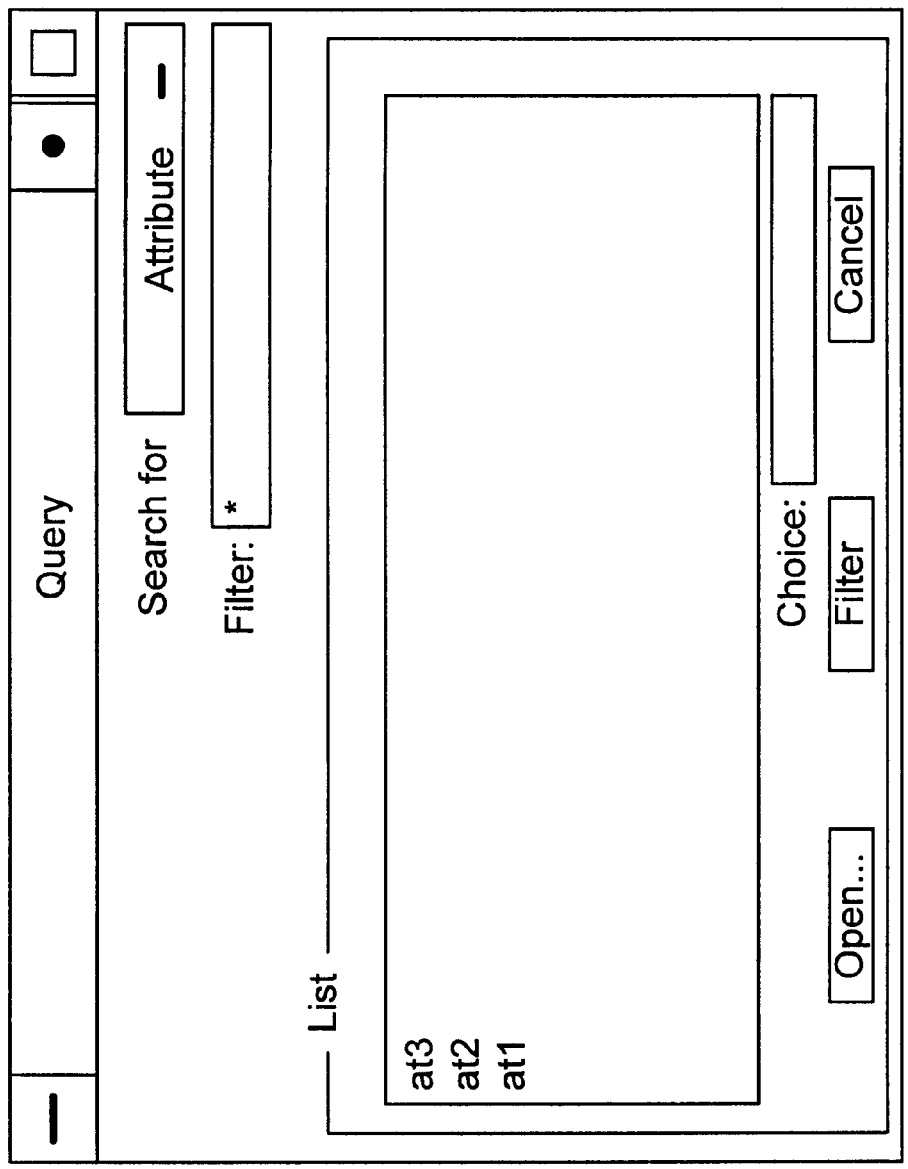
FIGS. 7a and 7b are illustration of two forms that may be used to query the system about operational runtime information based on a set of filters (e.g., status, start time, request name)
Figure 7B:

A particular query may be defined using a screen display query window such as illustrated in FIG. 7*a* for example. The query window allows an authorized role to define queries based on a) filters using regular expressions, and b) entities (definitions and requests) that filters are applied to. The format of a query is: <Entity><filters . . . >. Filters can be specified either by generic regular expressions or using specific filter dialog windows such as shown in FIG. 7*b* with specific options (filters) according to different types of entities such as process and request. A filter dialog consists of an ordered list of fields that are displayed in the query window. For each field there are two columns indicating the sort-order and method (ascending or descending), and two columns for the filter. Changing the method that the list in the query window is sorted is accomplished by dragging and dropping the sort-order numbers. The filter dialog will then be redrawn with the fields in the new order. To change the method of sorting, an authorized role changes the check box beside the field name. To set a filter, beside the field name, a role chooses the operator ("<", "<=", "=", "!=", ">=", ">", "contains") and enters the values. For some fields not all operators will apply. For some fields there may be specific values, e.g., "now" for fields that contain a time. The contents of a filter can be saved to a file using file-Save or file-Save as, and retrieved from a file using file-Open. When the contents of the filter dialog are to be applied to the query window, the OK button should be pressed. To not use the contents of the dialog, press the cancel button. Pressing either button will close the dialog frame. Pressing the apply button, will update the query windows contents, but the dialog will remain. The window named process monitor shows relevant fields for process instances. The window named request monitor shows relevant fields for request entities.

Figure 8A:
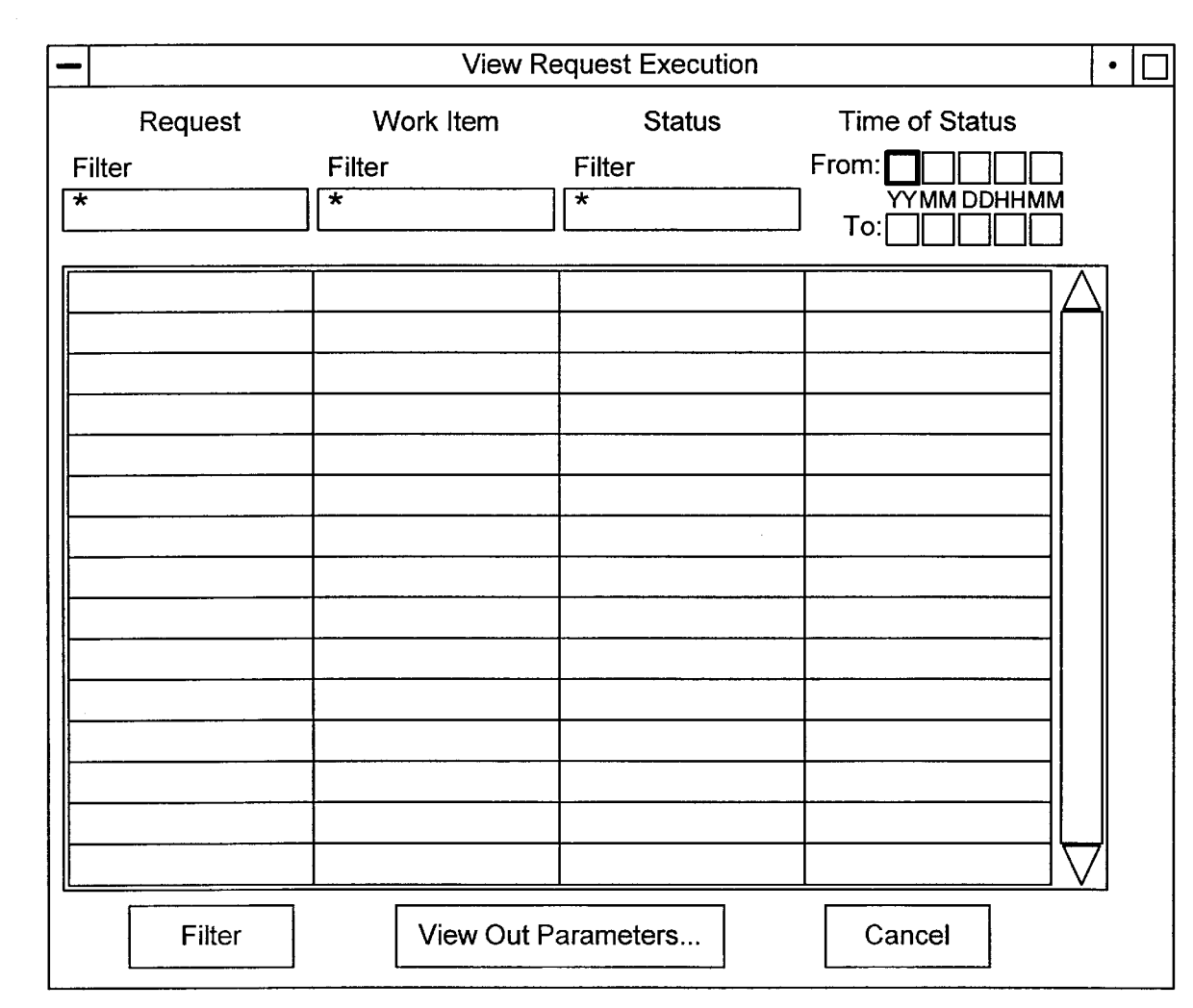
Figure 8B:
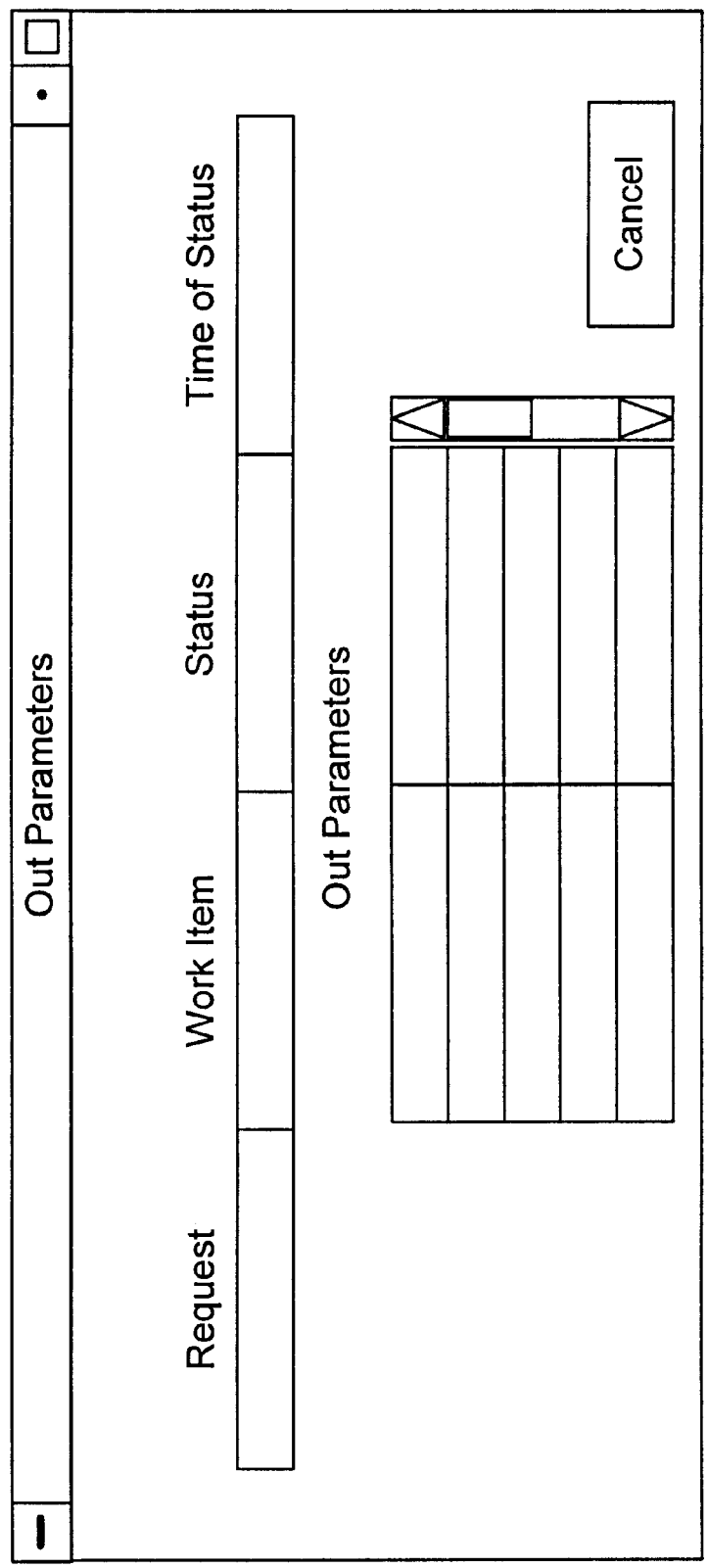

This results in ViewRequestExecution window display such as illustrated in FIG. 8*a*. This window displays the results of a query that uses either regular expression based filters or the filters shown in the request monitor filter window (FIG. 7*b*). The request query window has a button that can be pressed to access the filters. The description of the named columns of FIG. 8*a* are as follows: request: the name of the request instance; Process: the name of the requested process instance; Activity: the name of all the activity instances under the requested process; Status: the status of all the activities (e.g., executing, cancelled and pending, cancelled and terminated); Out parameters: shows in a menu such as the example of FIG. 8*b* the output attribute values for a selected work item.

Process Definition

There are many ways by which process definitions for use with the process automation system may be created. One preferred method of process definition creation will now be described with reference to FIGS. 9 to 16.

Figure 9:
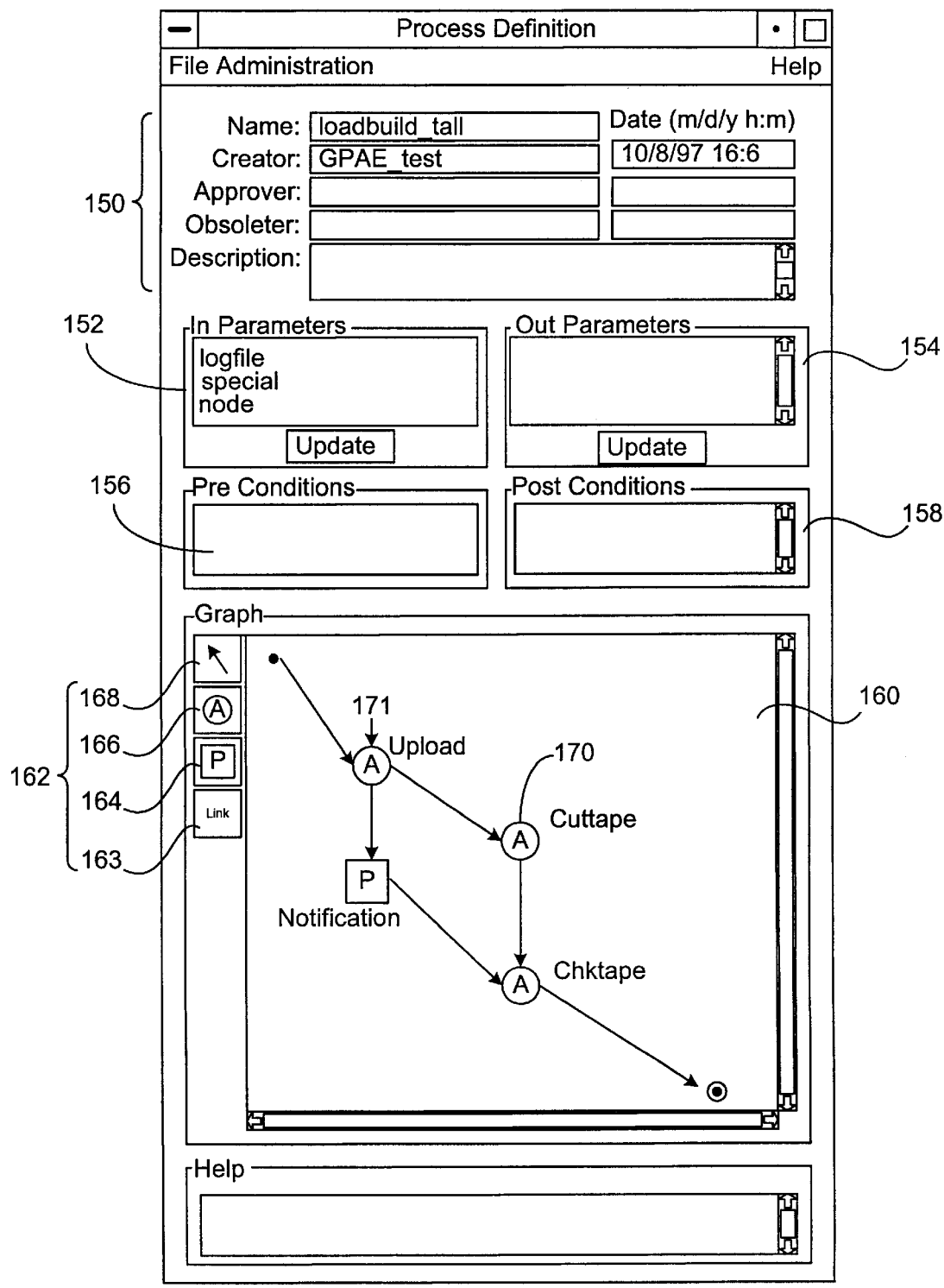
FIG. 9 is an illustration of a process definition screen display.

A process definition may be created using a GUI such as shown in FIG. 9. A process definition includes process description information 150, attribute definitions which include in parameters 152 and out parameters 154, pre conditions 156 and post conditions 158 and a graph pane 160 of work items.

The graph 160 of a process definition consists of one or more work items connected with links. A work item may be another process definition (a sub-process which is itself defined) or an activity definition, an activity being the unit of atomic work. A palette symbol menu 162 for process definition includes four palette items namely a link 163, a square 164, a circle 166 and an arrow 168. The selection of each of these items allow actions on the graph pane as follows: a) arrow 168: its selection allows a user to select and double click on graph components (circle, square, link) in the graph pane (160) so as to edit them or to move them around in the graph pane; b) Circle 166: allows a user to draw an activity definition symbol by selecting it, dragging it and dropping it in the graph pane; c) rectangle 164: allows a user to draw a process definition symbol by selecting it, dragging it and dropping it in the graph pane; d) link 163: allows a user to draw a link between two graph components by clicking both an origin work item and a destination work item in the graph pane.

A process definition can nest a set of process definitions in a linear or recursive manner. The process definition menu may be used to navigate and edit a containment hierarchy of processes and activities.

A link represents the order of potential execution of two work items (origin and destination) and is represented by an arrow connecting the two work items. The work item at the tail of an arrow (origin work item) executes first and then the work item pointed to by the arrow (the destination work item) may execute depending upon whether the conditions on the incoming links, the post-conditions on the origin work item(s), and the pre-conditions of the destination work item(s) are satisfied.

To create a graph, the symbols (circle, square and link) in the palette symbol menu may simply be selected, dragged and dropped on the graph pane 160. A particular work item in the graph is associated with either a process definition or an activity definition depending on the symbol used in the graph for the work item. By double clicking on the work item, an entity to be associated with that work item may be selected using a menu such as the pop-out work item properties menu, shown on FIG. 10. In this example, the work item indicated by 170 has been selected by double clicking on the circle. In the resulting work item properties menu of FIG. 10, the work item has been given the name "Cuttape". It is then associated with a particular activity definition by inputting an activity definition in a field within a window entitled "workflow definition". By clicking on the "select a work item" icon, a menu listing available activities such as shown in FIG. 11 will pop up allowing a user to select an activity definition from the list. Similarly, by clicking on the work item which is a process definition, a work item properties window would pop up, and a list similar to that of FIG. 11 would pop up, but which contains a list of process definitions. In this manner all of the work items in the graphical display are associated with process definitions or activity definitions.

Figure 12:
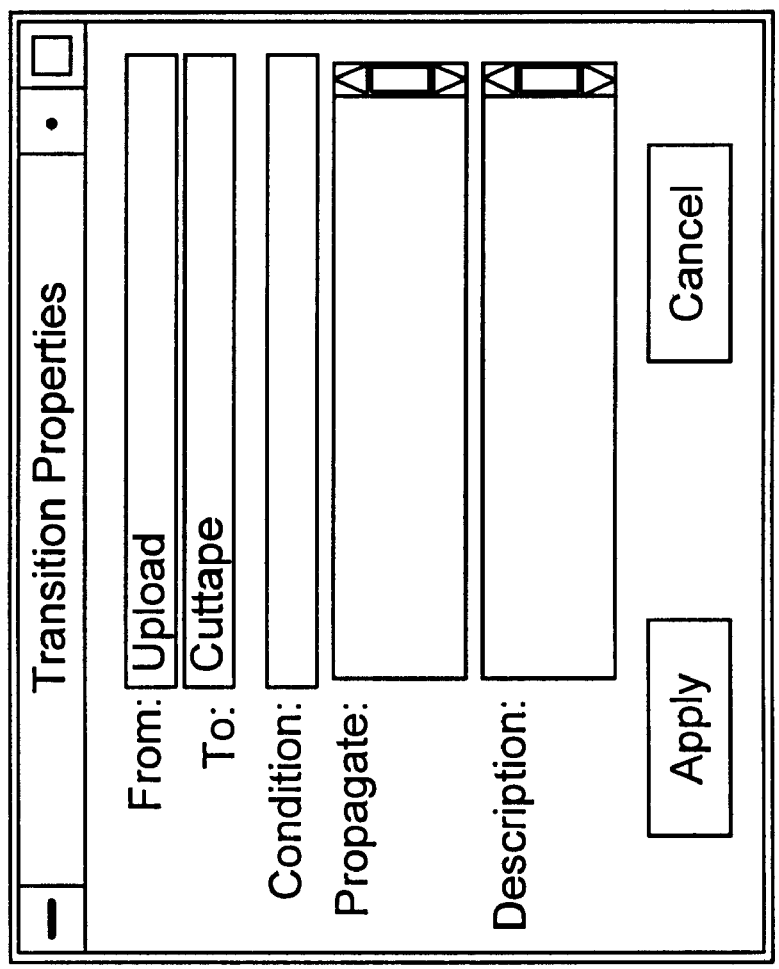
FIG. 12 is an example of a screen display form which may be used to define a transition.

To set the conditions on the links shown on the graph pane 160 of the process definition menu (FIG. 9), a role double clicks on a link; this pops out a transition properties menu such as shown in FIG. 12. The transition properties menu is used to capture the conditions on a transition (link) between two work items, based on relations and values of in parameters and out parameters. This menu is also used to capture the explicit propagation rules which determine which output parameters of a given work item are to become input parameters for another work item.

FIG. 12 shows the menu used to capture the properties of transitions. A transition specifies the attributes of a link between two work items. FIG. 12 also shows an example of the transition from an "Upload" activity (171 in FIG. 9) to a "Cuttape" activity (170 in FIG. 9). The condition field allows the capture of a condition on the transition. The syntax allows "OR" and "AND" expressions and more generally is of the form: <attribute> operator <value> where attribute is an out attribute of an activity, operator is any of ("<", "<=", "=", "!=", ">=", ">"), and value is an integer. For example (rc!=0). The propagate field allows for the capture of the propagation rules. The description field allows the capture of meaningful documentation about the transition (e.g., to describe the purpose and meaning of a transition).

Attribute propagation rules: the attribute propagation rules contain implicit (default) and explicit propagation rules. These propagation rules are entered by an authorized role at build time and enforced at run time by a process instance (PI). A PI assigns the proper values to the in and out attributes of activities before and immediately after the enactment of an activity. The in attribute default propagation rules are: a) An in attribute gets the value from its predecessor work item's (parent's) matching out attribute name. b) If an attribute matching name is not found then the search is done with respect to the containing process. c) If an input matching name is not found in the containing process then the value for the in attribute is set to a default value stored in the work item's definition. An explicit input propagation rule overrides the default rules. The syntax of an explicit propagation rule is as follows: attribute_2=attribute_1 that is, the value on the right of the assignment operator (attribute_1) is copied to (by value) to the left of the assignment operator (attribute_2). According to this syntax, attribute_2 specifies the name of an in attribute of a work item (e.g., activity_2) associated with a work node in a process definition (ProcessDef_x), and attribute_1 specifies the name of an out attribute of a work item (e.g., activity_1) associated with a work node in a process definition (ProcessDef_x).

Explicit out attribute rules for a process are defined on the final links in the process instance's graph. They have the following format:

<vertex_name>.<workItemName>.<attrDefnName>
      where vertex_name and work node are used interchangeably.

For all out attributes of the process, the process instance does the following: If an explicit out attribute rule exists, then the value is set according to that rule; If an explicit rule does not exist, then it follows the implicit rules which are: Find the same attribute name in the out attributes of the previous work item instances which have been executed and have a link with a true condition into this node. If found there then take the value from the first one found, and if not found there, then it checks the containing process in attributes and if found there then take that value.

For activities, if an out attribute was not set explicitly, and an in attribute exists with the same name, that value will be copied to the out attribute. The value copied to the out attribute is taken from the first work item's in attribute matching name, according to a left to right graph traversal rule.

Figure 13:
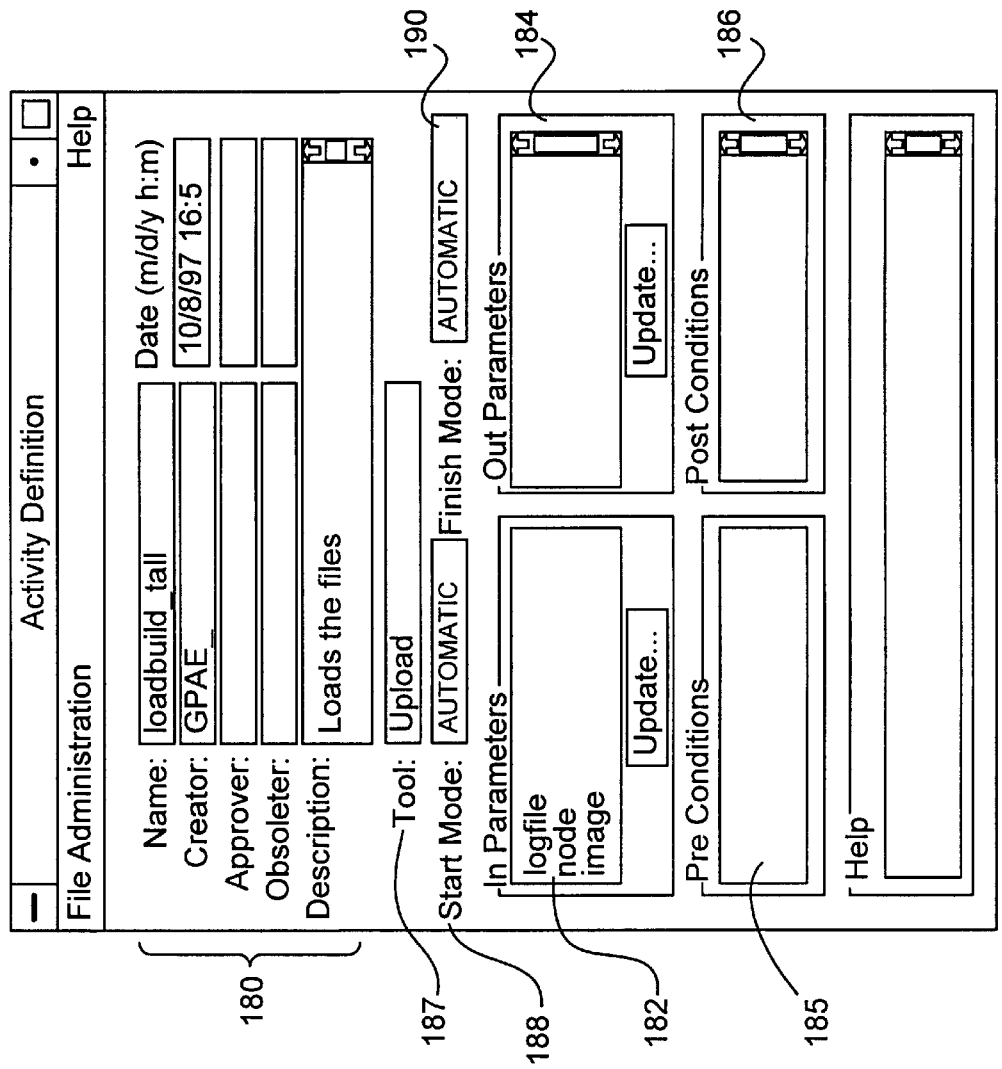
FIG. 13 is an illustration of an activity definition screen display.
Figure 14:
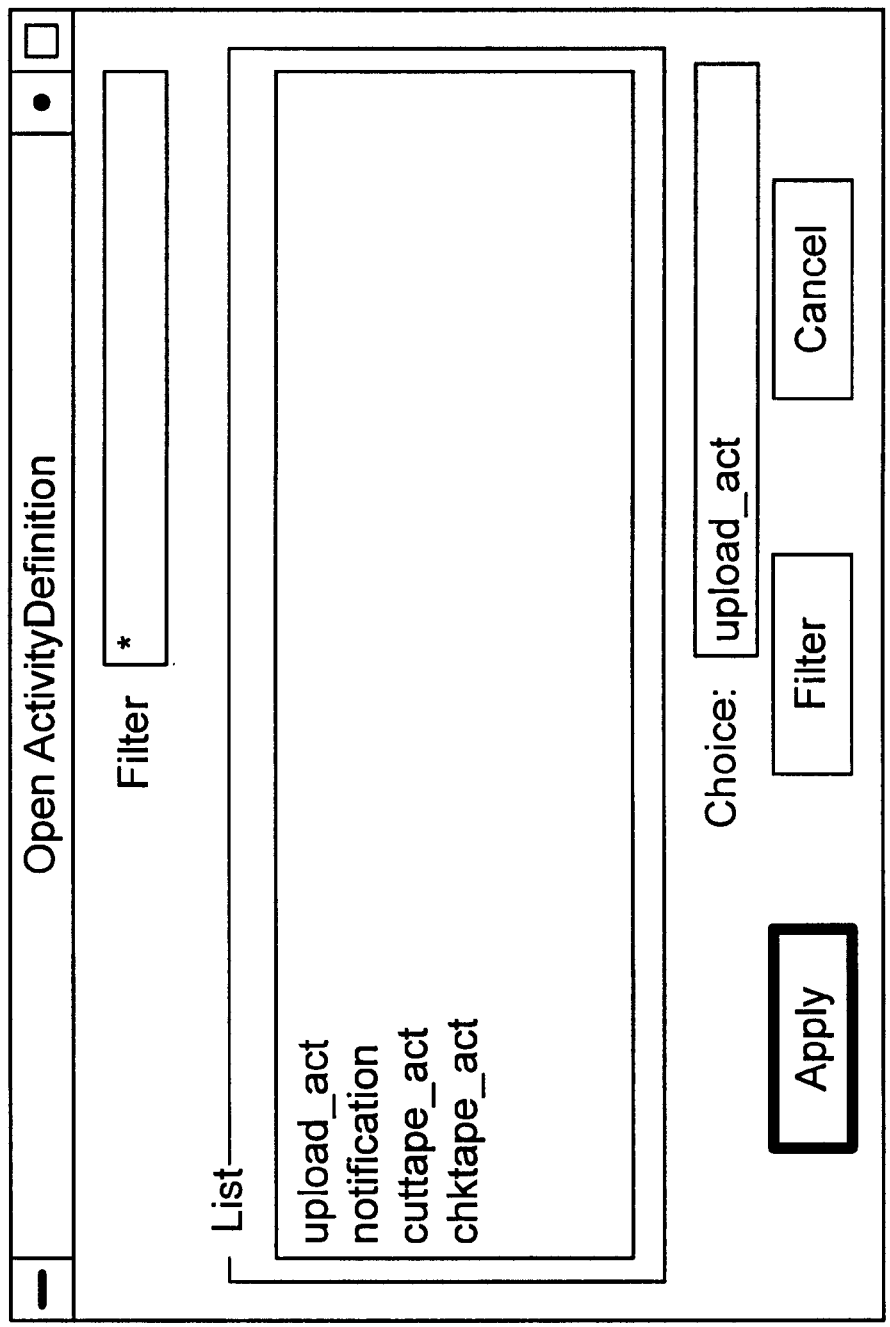
FIG. 14 is an illustration of a screen display form which may be used to open and view an activity definition.

An activity definition may be created or amended using a menu such as shown in FIG. 13. An activity definition is the definition of an atomic unit of work to be executed by an agent (a role or a tool). A particular activity definition to be opened and edited can be selected using a GUI menu such as the menu shown in FIG. 14. The activity definition GUI menu of FIG. 13 is similar in some respects to the process definition menu of FIG. 9. It includes activity definition description information 180, attribute definitions which include in parameters 182 and out parameters 184, and pre conditions 185 and post conditions 186. It also includes a field 187 to select a tool (software application) to execute the activity, and includes a start mode field 188, and a finish mode field 190. The start mode and finish mode describe the degree of automation when triggering and terminating an activity. There are two automation modes: automatic mode is fully controlled by the workflow engine, i.e. the engine proceeds executing the workflow after e.g. an application implementing the activity has properly terminated and returned control. Manual mode requires user interaction, i.e. control is passed to the engine (process instance) to proceed executing the workflow only after an explicit role sign-on for termination of this activity. The automation modes can be applied to the start and end of an activity.

Start mode: describes how the execution of an activity is triggered. The default start mode is automatic in which case the execution is triggered implicitly by the system. Alternatively, it may be manual which requires the execution to be triggered explicitly by the end user.

Finish mode describes how the system operates at the end of the activity. A finish mode of automatic results in an automatic return when the invoked application finishes control, and a finish mode of manual requires the end user to terminate the activity explicitly.

Figure 15:
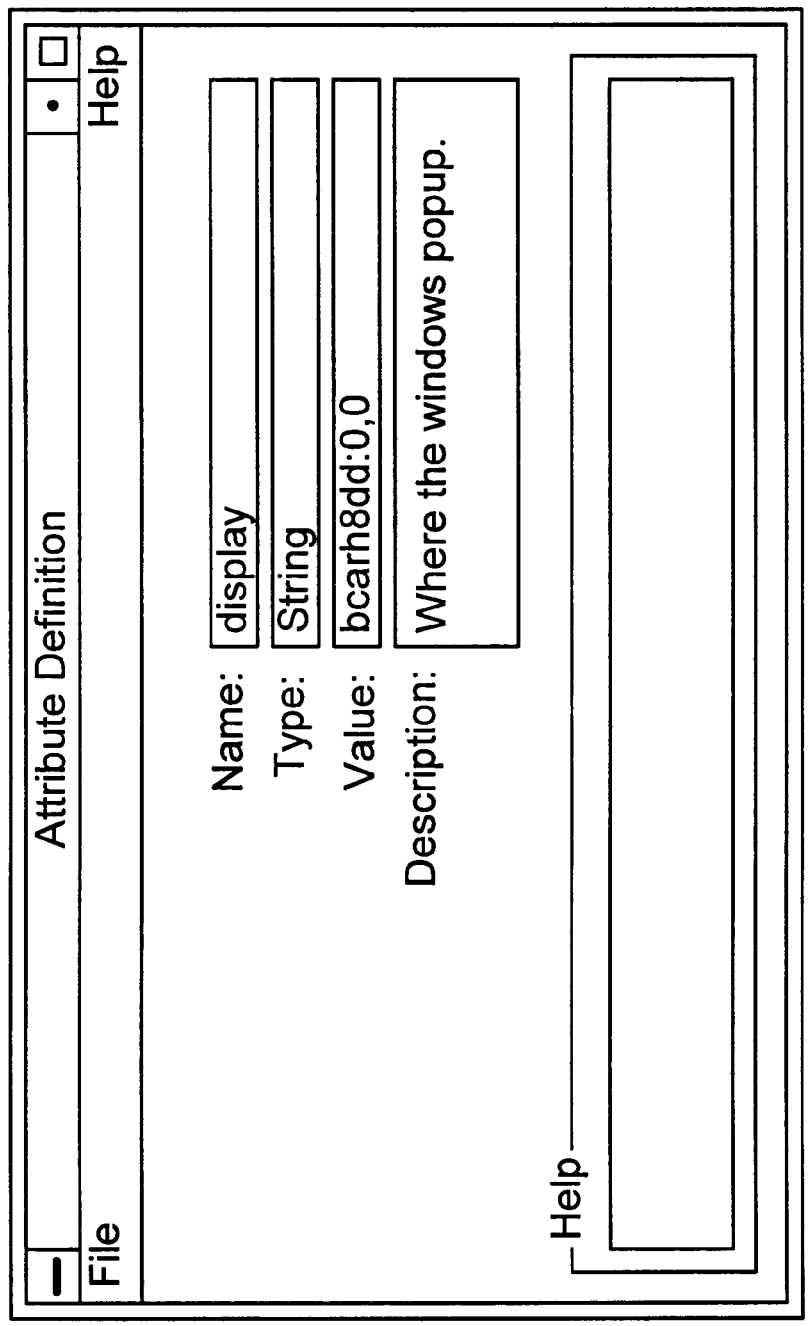
FIG. 15 is an illustration of a display for specifying attribute definitions (input and output arguments) for activity and process definitions.

An attribute definition may be created and or amended using a menu such as shown in FIG. 15. FIG. 15 shows the attribute definition menu. Attribute definitions are used to specify the name, type, default value, and description of an attribute. An attribute is similar to a programming typed variable that holds data. An in attribute definition specifies the input parameter for a work item; an out attribute definition specifies the output parameter for a work item. A name uniquely identifies an attribute definition; a type defines a structure type (e.g., integer, string, union, etc.); a value is a data value that fills the defined type holder; a description explains the purpose of the attribute definition.

For example, FIG. 15 shows an attribute named "display" which can be used by an activity to display some information on a specific computing node's terminal display (i.e., bcarh8dd:0.0).

To capture the process definition, the implementation of the buildtime part is preferably compliant to and extends the Workflow Process Definition Language (WPDL) adopted by the Workflow Management Coalition (WfMC 97). A process definition can be considered as a static entity, which becomes dynamic when an instance of the process definition is created, scheduled and enacted by the GPAE's runtime part 24.

By way of example, a process definition will be described for a process used to compile software modules, execute a loadbuild, store the loadbuild output results in a repository and notify interested parties. This will be referred to as the COMP_LDBLD process (compile and loadbuild process). A process definition graph for COMP_LDBLD is shown in FIG. 16a and consists of four main sub-processes, these being a compile sub-process, a loadbuild sub-process, a store sub-process, and a notify sub-process. For simplicity, links with error conditions are not shown on FIG. 16a.

The compile sub-process extracts source code from a version control repository, and compiles in parallel on multiple resources the S/W modules, considering dependency rules.

The loadbuild sub-process executes after the successful completion of the compile process. It takes the output of the compile process as its input (according to the work item attributes' propagation rules) and a set of functional inputs, and generates an initialized load (an executable).

The store process executes after the successful completion of the loadbuild process. It stores the generated executable into a repository for its worldwide global access (once the status of the load is set to "Released").

The notification process notifies those roles that registered interest about the event regarding either the successful completion or failure of the process.

Figure 16B:
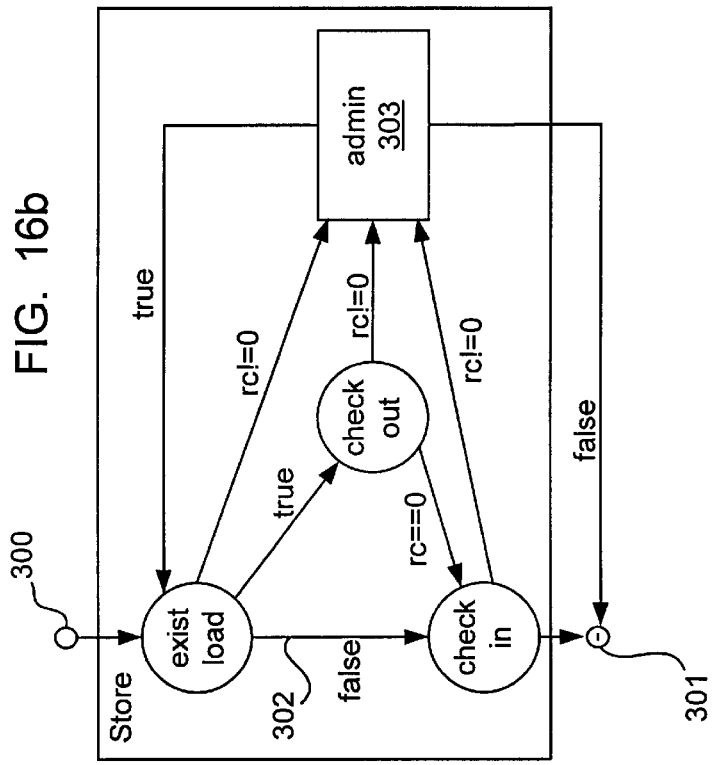
FIGS. 16a and 16b are illustrations of an example of a process definition and its sub-processes.
Figure 16A:
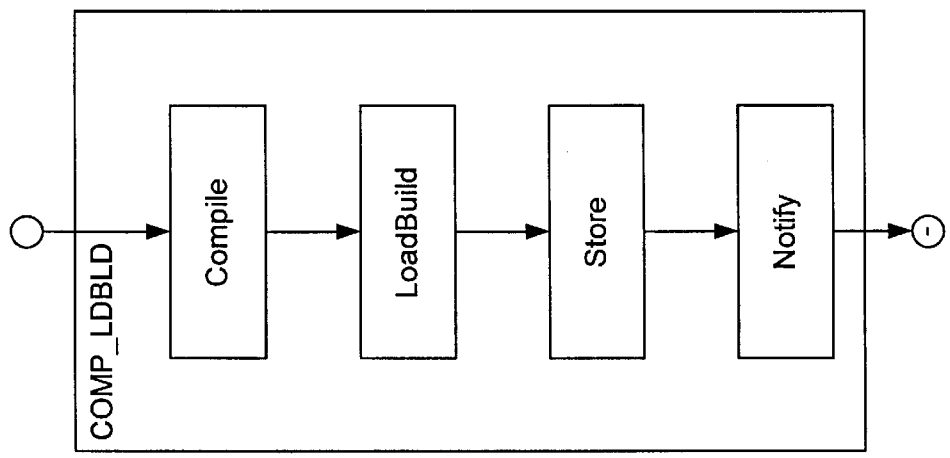

In FIG. 16b, a further breakdown of the store process of FIG. 16a is shown to illustrate activities, links and conditions on links. As described previously, each work item (activity or process) contains in attributes and out attributes, as well as pre and post conditions. In addition, a set of explicit and implicit rules (default rules) specify the direction of propagation of out attributes of a set of work items to in attributes of another set of work items. A process definition may contain references to sub-processes, separately defined, which make up part of the overall process definition. For example, the store process detailed in FIG. 16b contains the subprocess "admin" 303. It is the process definition which is interpreted by the engine (i.e., a process instance), acting as a template for the creation and control of instances of that process during process enactment.

The store process shown on FIG. 16b consists of a network of activities and their relationships 302, criteria to indicate the start 300 and termination 301 of the process, and information about the individual activities, such as associated agents and attributes, etc. In this example, the store process starts by executing the activity "exist load". The "exist load" checks the existence of a given load in a repository. If the output of this activity is "true" and a return code (rc) captured in an out attribute is also true then the "check out" activity is executed. If instead, the output of the "exist load" activity is false and a return code (rc) captured in an out attribute of "exist load" is true then the "check in" activity is executed. If the return code (rc) captured in an out attribute of "exist load" is false (rc!=0) then the "admin" process is executed instead. The arrows represent links between work items. The conditions on these arrows 302 aid a process instance (one of many GPAE distributed work flow engines) to determine what must be executed next.

The store process includes the activities "exist load", "check out", "check in" and the sub-process "admin". The activities are connected with conditional links. When the "Store" process is enacted, the activity "exist load" first executes. If the outcome of this execution is "true" then the "check out" activity will execute; if instead the outcome of the execution of the "exist load" activity is false, then the "check in" activity will execute. If any of the activities fail (the return code "rc" is different of zero) then the "admin" processes will execute. The admin process will then issue an event (not shown on the Figure) that will be received by the work list menu(s).

Figure 17:
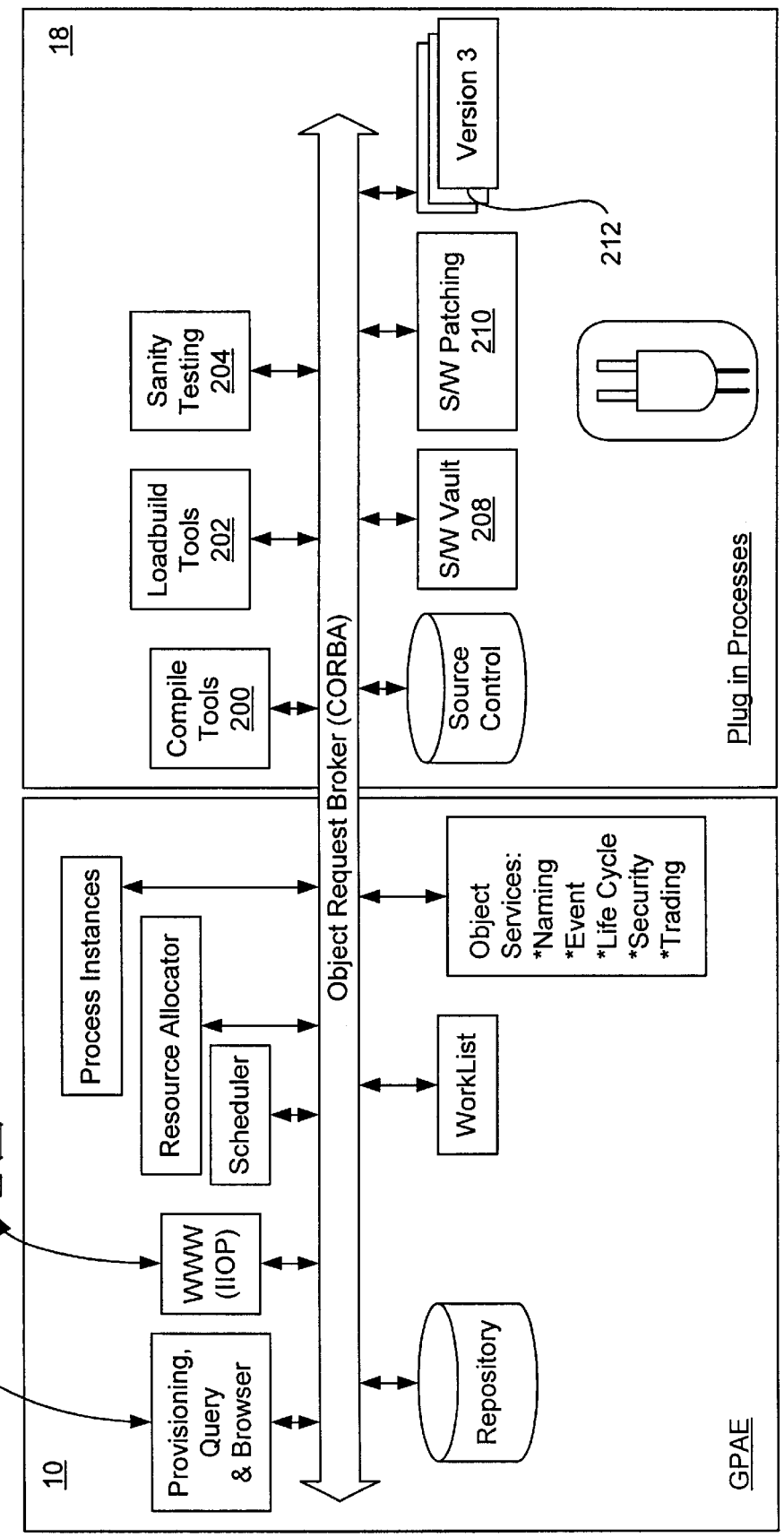
FIG. 17 is an example of the process automation system of FIG. 1 applied to a particular application.

FIG. 17 is a modified version of FIG. 3 for the above described COMP_LDBLD process. In this example, the plugged in processes (applications or agents available to execute activities) include compile tools 200, loadbuild tools 202, sanity testing tools 204, a source control repository 206, a software vault 208, software patching tools 210, and various version definitions 212.

The source control repository 206 is a tool which stores source code under version control. The compile tools 200 are tools which compile the source code to produce object files that correspond to a specific target computer architecture. The loadbuild tools 202 produce an executable binary file as the result of assembling object files. The sanity testing 204 tools execute a set of test suites that check the behavior of the executable under typical scenarios at run time. The software vault 208 is a repository that stores executables under version control. This repository is accessed by software distribution centres located in geographically dispersed regions to distribute the executables to interested parties. The software patching tools are used to fix problems detected in the executable by applying corrections to them and producing a new version (of that executable product) in the software vault 208. The other versions of tools 212 represent new versions of the above tool sets that are used to test new functionality (e.g., an optimization to the compile toolset) without affecting the production environment or existing processes.

These toolsets are plugged-in to the CORBA bus to execute a set of process definitions, similar to the one shown in FIG. 16a and FIG. 16b. Given the above, an operator can submit a request to GPAE to enact an end-end process that is executed by the described toolsets. The execution of a new process or the addition of new tools that execute a new process does not require any kind of code modifications to GPAE.

Requests

Figure 18:
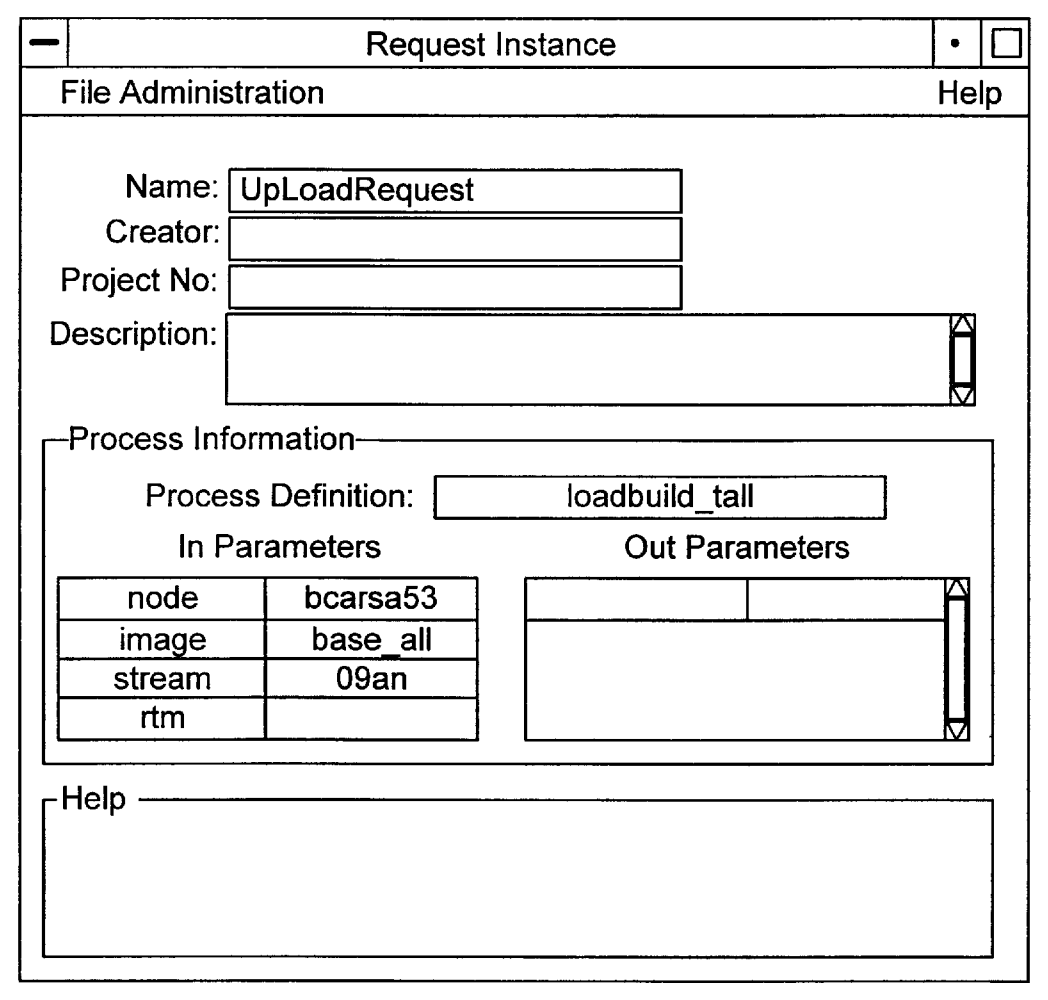

A request may be generated using a GUI menu such as a request instance GUI menu shown on FIG. 18 to request the enactment of a process definition. This menu is also used by a role to provide the values for the in parameters (inputs to the selected process)

Reliability

A set of architectural components may be provided which are responsible for the "sanity" of GPAE. One such component is a server monitor which checks operational aspects of the servers registered with the implementation repository. It also uses a process definition to detect a server malfunction and based on a set of heuristics stored in a persistent repository, executes corrective actions, or logs a diagnosis of the problem(s) to be dealt with by an administrator role.

Another such component is a fail-over mechanism through which runtime information is stored persistently. If a server crashes, a new server of the same type can be activated and initialized with the state retrieved from the persistent repository.

Scalability

A chain of GPAE systems can be placed in strategic locations to control the use of globally available resources. These GPAE systems can be plugged-in to a hierarchy of ORBs. This allows a request that can not be serviced by a local GPAE to be serviced by a remote GPAE plugged-in to an ORB within the ORB hierarchy.

A pool of CORBA servers may be made available to the chain of GPAE systems. They include: request instance server, process instance server, activity instance server, tool manager server. These servers contain instances of objects of the same type. For example the activity instance server contains activity instance objects, the process instance server contains process instance objects, and so on.

Flexibility

The process automation system has the flexibility and openness aspects of a dynamic implementation. Referring again to the example of FIG. 17, the left frame 10 shows a logical view of the GPAE engine, and the right frame 18 shows a set of tools plugged-in to the CORBA bus. GPAE allows the following at runtime:

new implementation of a server can be plugged-in;

a new service can be added to the system. This involves the registration of the server with (a) CORBA interface the repository (IFR) and the potential use of its interface, using the CORBA dynamic invocation interface and (b) the CORBA Implementation Repository (IR) to record each server's name and executable code file name;

new policies, modelled as objects stored persistently, can be selected at run time to: a) change notification means, b) change scheduling and resource allocation policies, c) change role access privileges, and d) change security control mechanisms (such as authentication, encryption and audit trail).

Numerous modifications and variations of the present invention are possible in light of the above teachings. It is therefore to be understood that within the scope of the appended claims, the invention may be practised otherwise than as specifically described herein.

We claim:

1. A process automation system for controlling the execution of processes on a plurality of processing nodes each having processing agents associated therewith, the system comprising a GPAE (generic process automation engine) and an ORB (object request broker) bus connected to the plurality of processing nodes, the GPAE having:

a) a build time part for creating and storing at least one process definition identifying a logical sequence of work items, pre-conditions and post-conditions for the execution of work items, and propagation rules for propagating outputs of work items to inputs of other work items, and for creating and storing a request to create a process instance for a particular process definition;

b) a run time part comprising process instance servers for coordinating the enactment of the work items forming part of the process definitions and a scheduler for scheduling each work item forming part of the process definition either for execution at a given time and by a particular processing agent on a particular one of the processing nodes or for execution by a human, the scheduler using constraint propagation logic;

wherein the ORB is a CORBA bus, and the process instance servers are CORBA Process Servers that contain a set of process instance objects that control the execution of the work items forming part of the process definition for the relevant process instance.

2. A system according to claim 1 wherein the build time part stores process definitions in a persistent catalog, and wherein the process definitions are defined using an extension of the WfMC (Workflow Management Coalition) process definition language (WPDL).

3. A system according to claim 1 wherein work items to be executed by processing nodes are defined by activity definitions which are defined as objects in a persistent catalog.

4. A system according to claim 3 wherein a new process definition can be created by composing versions of existing activity or process definitions.

5. A system according to claim 3 wherein the termination of an activity becomes an event that triggers a process instance to evaluate the conditions needed to execute the next set of activities in the process definition, and interact with the scheduler to determine where and when to execute the next set of activities.

6. A system according to claim 1 wherein the multi-threaded scheduler creates a near optimal schedule in real time and considers the constraints of a set of concurrent activities, and the available resources, according to resource utilization goals.

7. A system according to claim 6 wherein the resource utilization goals may be redefined during run time.

8. A system according to claim 6 wherein the utilization goals are stored in a persistent goals catalog.

9. A system according to claim 1 further comprising a persistent store for operational data, historical data, and system state information, the operational data being used to determine further process efficiencies and to report progress, the historical data being used for root cause analysis and to audit past requests, and the system state information being used to recover GPAE from system failures and network failures.

10. A system according to claim 1 further comprising a query server which answers queries related to buildtime information (i.e., process and activity definitions) and runtime information (e.g., progress of processes' execution states).

11. A system according to claim 1 further comprising means for notifying an outcome of runtime events to interested parties by extending the CORBA's event service model.

12. A system according to claim 11 wherein the notification is done by displaying tasks to be completed by humans in a worklist menu.

13. A system according to claim 1 wherein work items requiring human execution are multicasted to worklist menus.

14. A system according to claim 1 wherein a plurality of GPAE systems, distributed in strategic geographical locations, are CORBA connected to share global processes, services and resources.

15. A process automation system for controlling the execution of processes on a plurality of processing nodes each having processing agents associated therewith, the system comprising a GPAE (generic process automation engine) and an ORB (object request broker) bus connected to the plurality of processing nodes, the GPAE having:

a) a build time part for creating and storing at least one process definition identifying a logical sequence of work items, pre-conditions and post-conditions for the execution of work items, and propagation rules for propagating outputs of work items to inputs of other work items, and for creating and storing a request to create a process instance for a particular process definition;

b) a run time part comprising process instance servers for coordinating the enactment of the work items forming part of the process definitions and a scheduler for scheduling each work item forming part of the process definition either for execution at a given time and by a particular processing agent on a particular one of the processing nodes or for execution by a human, the scheduler using constraint propagation logic;

wherein processing agents may be added, deleted or changed during run time.

* * * * *